United States Patent [19]
Deering

[11] Patent Number: 6,088,034
[45] Date of Patent: Jul. 11, 2000

[54] DECOMPRESSION OF SURFACE NORMALS IN THREE-DIMENSIONAL GRAPHICS DATA

[75] Inventor: Michael F. Deering, Los Altos, Calif.

[73] Assignee: Sun Microsystems, Inc., Palo Alto, Calif.

[21] Appl. No.: 09/028,387

[22] Filed: Feb. 24, 1998

Related U.S. Application Data

[62] Division of application No. 08/511,326, Aug. 4, 1995, Pat. No. 5,794,015.

[51] Int. Cl.$^7$ ..................................................... G06T 15/00
[52] U.S. Cl. ............................................ 345/420; 345/426
[58] Field of Search ..................................... 345/420, 426

[56] References Cited

U.S. PATENT DOCUMENTS

| | | |
|---|---|---|
| 4,881,067 | 11/1989 | Watanabe et al. . |
| 4,930,092 | 5/1990 | Reilly . |
| 5,142,635 | 8/1992 | Saini . |
| 5,216,726 | 6/1993 | Heaton . |
| 5,231,676 | 7/1993 | Mahoney . |
| 5,280,547 | 1/1994 | Mahoney . |
| 5,295,235 | 3/1994 | Newman . |
| 5,363,107 | 11/1994 | Gertz et al. . |
| 5,408,605 | 4/1995 | Deering . |
| 5,440,682 | 8/1995 | Deering . |
| 5,485,559 | 1/1996 | Sakaibara et al. . |
| 5,517,611 | 5/1996 | Deering . |
| 5,533,148 | 7/1996 | Sayah et al. . |

(List continued on next page.)

FOREIGN PATENT DOCUMENTS

| | | |
|---|---|---|
| 0 536 801 A2 | 4/1993 | European Pat. Off. . |
| 0 594 304 A2 | 4/1994 | European Pat. Off. . |
| 0 757 332 A2 | 2/1997 | European Pat. Off. . |
| 2 302 002 | 12/1996 | United Kingdom . |
| 90/06647 | 6/1990 | WIPO . |

OTHER PUBLICATIONS

"Nonpolygonal Isosurface Rendering for Large Volume Data Sets," J.W. Durkin and J.F. Hughes, 1070–2385/94, 1994, IEEE, pp. 293–300.

"Compressing the X Graphics Protocol," J.F. Dansin, Ph.D., Dissertation, Princeton Univ. Dept. of Computer Science, Princeton, N.J., Nov. 1994, 143 pages.

"Sun Breaks the Bottlenecks," Bill Fleming, BYTE, Nov. 1993, pp. 218, 222, 224.

"The Triangle Processor and Normal Vector Shader: A VLSI System for High Performance Graphics," Deering, et al., Computer Graphics, vol. 22, No. 4, Aug. 1988, 5 pages.

"Higher Bandwidth," John Danskin, Princeton Univ. Dept. of Computer Science, Association of Computing Machinery, Multimedia 94–10/94, 1994, ACM–0–89791–686–794/0010, pp. 89–96.

"Geometry Compression," Michael Deering, Sun Microsystems, Siggraph 95, Computer Graphics Proceedings, Annual Conference Series 1995, ACM–0–89791–701–4/95/008, pp. 13–20.

*Primary Examiner*—Mark R. Powell
*Assistant Examiner*—Motilewa Good-Johnson
*Attorney, Agent, or Firm*—Conley, Rose & Tayon, P.C.; Dean Munyon; Jeffrey C. Hood

[57] ABSTRACT

Three-dimensional compressed geometry is decompressed with a unit having an input FIFO receiving compressed data bits and outputting to an input block state machine and an input block, whose outputs are coupled to a barrel shifter unit. Input block output also is input to Huffman tables that output to the state machine. The state machine output also is coupled to a data path controller whose output is coupled to a tag decoder, and to a normal processor receiving output from the barrel shifter unit. The decompressor unit also includes a position/color processor that receives output from the barrel shifter unit. Outputs from the normal processor and position/color processor are multiplexed to a format converter. For instructions in the data stream that generate output to the format converter, the decompression unit generates a tag sent to the tag decoder in parallel with bits for normals that are sent to the format converter. The decompressed stream of triangle data may then be passed to a traditional rendering pipeline, where it can be processed in full floating point accuracy, and thereafter displayed or otherwise used.

176 Claims, 17 Drawing Sheets

U.S. PATENT DOCUMENTS

| | | |
|---|---|---|
| 5,537,551 | 7/1996 | Denenberg et al. . |
| 5,546,477 | 8/1996 | Knowles et al. . |
| 5,613,102 | 3/1997 | Chiang et al. . |
| 5,671,401 | 9/1997 | Harrell . |
| 5,694,531 | 12/1997 | Golin et al. . |
| 5,736,987 | 4/1998 | Drucker et al. . |
| 5,740,281 | 4/1998 | Hirai . |
| 5,751,865 | 5/1998 | Micco et al. . |
| 5,798,762 | 8/1998 | Sfarti et al. . |
| 5,801,711 | 9/1998 | Koss et al. . |
| 5,842,004 | 11/1998 | Deering et al. . |
| 5,867,167 | 2/1999 | Deering . |
| 5,870,094 | 2/1999 | Deering . |

| TAG | ΔX OR ABS X | ΔY OR ABS Y | ΔZ OR ABS Z |
|---|---|---|---|

FIG. 4I

| TAG | $\Delta\hat{\theta}1$ | $\Delta\hat{\phi}1$ |
|---|---|---|

FIG. 4J-1

| TAG | SECT | OCT | $\hat{\theta}$ | $\hat{\phi}$ |
|---|---|---|---|---|

FIG. 4J-2

| TAG | ΔR OR ABS R | ΔG OR ABS G | ΔB OR ABS B | Δα OR ABSα |
|---|---|---|---|---|

FIG. 4K

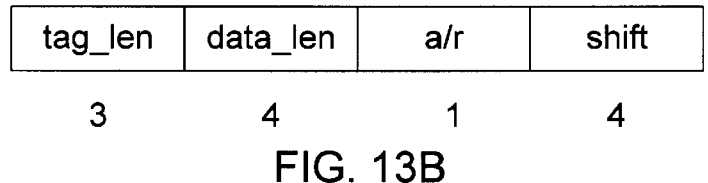
FIG. 13B
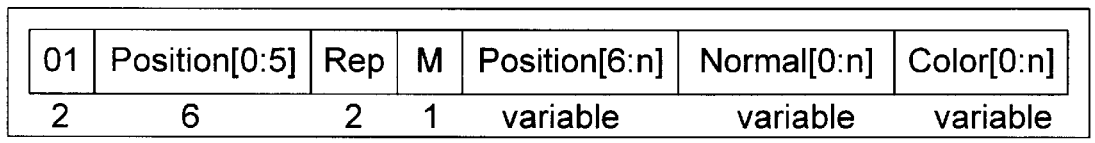
FIG. 14A
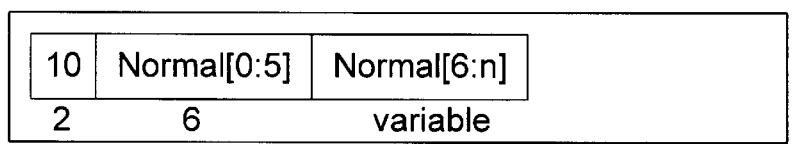
FIG. 14B
FIG. 14C 6,088,034

DECOMPRESSION OF SURFACE NORMALS IN THREE-DIMENSIONAL GRAPHICS DATA

CONTINUATION DATA

This application is a divisional of U.S. application Ser. No. 08/511,326 ("Method and Apparatus for Decompression of Compressed Geometric Three-Dimensional Graphics Data" by Michael F. Deering and Aaron S. Wynn) which was filed on Aug. 4, 1995, U.S. Pat. No. 5,794,015 and is hereby incorporated by reference as though fully and completely set forth herein.

FIELD OF THE INVENTION

The present invention relates generally to decompressing graphics data, and more particularly to methods and apparatuses that decompress compressed three-dimensional geometry data.

BACKGROUND OF THE INVENTION

Modem three-dimensional computer graphics use geometry extensively to describe three-dimensional objects, using a variety of graphical representation techniques.

Computer graphics find wide use in applications ranging from computer assisted design ("CAD") programs to virtual reality video games. Complex smooth surfaces of objects can be succinctly represented by high level abstractions such as trimmed non-uniform rational splines ("NURBs"), and often detailed surface geometry can be rendered using texture maps. But adding more realism requires raw geometry, usually in the form of triangles. Position, color, and normal components of these triangles are typically represented as floating point numbers, and describing an isolated triangle can require upwards of 100 bytes of storage space.

Understandably, substantial space is necessary for three-dimensional computer graphics objects to be stored, e.g., on a computer hard disk or compact disk read-only memory ("CD-ROM"). Similarly, considerable time in necessary for such objects to be transmitted, e.g., over a network, or from disk to main memory.

Geometry compression is a general space-time trade-off, and offers advantages at every level of a memory/interconnect hierarchy. A similar systems problem exists for storage and transmission of two-dimensional pixel images. A variety of lossy and lossless compression and decompression techniques have been developed for two-dimensional pixel images, with resultant decrease in storage space and transmission time. Unfortunately, the prior art does not include compression/decompression techniques appropriate for three-dimensional geometry, beyond polygon reduction techniques. However, the Ph.D. thesis entitled *Compressing the X Graphics Protocol* by John Danskin, Princeton University, 1994 describes compression for two-dimensional geometry.

Suitable compression can greatly increase the amount of geometry that can be cached, or stored, in the fast main memory of a computer system. In distributed networked applications, compression can help make shared virtual reality ("VR") display environments feasible, by greatly reducing transmission time.

Most major machine computer aided design ("MCAD") software packages, and many animation modeling packages use constructive solid geometry ("CSG") and free-form NURBS to construct and represent geometry. Using such techniques, regions of smooth surfaces are represented to a high level with resulting trimmed polynomial surfaces. For hardware rendering, these surfaces typically are pre-tessellated in triangles using software before transmission to rendering hardware. Such software pre-tessellation is done even on hardware that supports some form of hardware NURBS rendering.

However, many advantages associated with NURBS geometric representation are for tasks other than real-time rendering. These non-rendering tasks include representation for machining, interchange, and physical analysis such as simulation of turbulence flow. Accurately representing trimming curves for NURBS is very data intensive, and as a compression technique, trimmed NURBS can not be much more compact than pre-tessellated triangles, at least at typical rendering tessellation densities. Finally, not all objects are compactly represented by NURBS. Although many mechanical objects such as automobile hoods and jet turbine blades have large, smooth areas where NURBS representations can be advantageous, many objects do not have such areas and do not lend themselves to such representation. Thus, while NURBS will have many applications in modelling objects, compressed triangles will be far more compact for many classes of application objects.

Photo-realistic batch rendering has long made extensive use of texture map techniques to compactly represent fine geometric detail. Such techniques can include color texture maps, normal bump maps, and displacement maps. Texture mapping works quite well for large objects in the far background, e.g., clouds in the sky, buildings in the distance. At closer distances, textures work best for three-dimensional objects that are mostly flat, e.g., billboards, paintings, carpets, marble walls, and the like. More recently, rendering hardware has begun to support texture mapping, and real-time rendering engines can also apply these techniques.

However, texture mapping results in a noticeable loss of quality for nearby objects that are not flat. One partial solution is the "signboard", in which a textured polygon always swivels to face the observer. But when viewed in stereo, especially head-tracked VR stereo, nearby textures are plainly perceived as flat. In these instances, even a lower detail but fully three-dimensional polygonal representation of a nearby object would be much more realistic.

Polyhedral representation of geometry has long been supported in the field of three-dimensional raster computer graphics. In such representation, arbitrary geometry is expressed and specified typically by a list of vertices, edges, and faces. As noted by J. Foley, et al. in *Computer Graphics: Principles and Practice*, 2nd ed., Addison-Wesley, 1990, such representations as winged-edge data structures were designed as much to support editing of the geometry as display. Vestiges of these representations survive today as interchange formats, e.g., Wavefront OBJ. While theoretically compact, some compaction is sacrificed for readability by using ASCII data representation in interchange files. Unfortunately, few if any of these formats can be directly passed as drawing instructions to rendering hardware.

Another historical vestige in such formats is the support of N-sided polygons, a general primitive form that early rendering hardware could accept. However, present day faster rendering hardware mandates that all polygon geometry be reduced to triangles before being submitted to hardware. Polygons with more than three sides cannot in general be guaranteed to be either planar or convex. If quadrilaterals are accepted as rendering primitives, it is to be accepted that they will be arbitrarily split into a pair of triangles before rendering.

Modem graphics languages typically specify binary formats for the representation of collections of three-dimensional triangles, usually as arrays of vertex data structures. Thus, PHIGS PLUS, PEX, XGL, and proposed extensions to OpenGL are of this format form, and will define the storage space taken by executable geometry.

It is known in the art to isolate or chain triangles in "zigzag" or "star" strips. For example, Iris-GL, XGL, and PEX 5.2 define a form of generalized triangle strip that can switch from a zigzag to star-like vertex chaining on a vertex-by-vertex basis, but at the expense of an extra header word per vertex in XGL and PEX. A restart code allows multiple disconnected strips of triangles to be specified within one array of vertices.

In these languages, all vertex components (positions, colors, normals) may be specified by 32-bit single precision IEEE floating point numbers, or 64-bit double precision numbers. The XGL, IrisGL, and OpenGL formats also provide some 32-bit integer support. The IrisGL and OpenGL formats support vertex position component inputs as 16-bit integers, and normals and colors can be any of these as well as 8-bit components. In practice, positions, colors, and normals can be quantized to significantly fewer than 32 bits (single precision IEEE floating point) with little loss in visual quality. Such bit-shaving may be utilized in commercial three-dimensional graphics hardware, providing there is appropriate numerical analysis support.

However compressed, geometric data including three-dimensional geometry data must be decompressed to be useful. For example, applicant's patent application Ser. No. 08/511,294 filed Aug. 4, 1995, entitled METHOD AND APPARATUS FOR GEOMETRIC COMPRESSION OF THREE-DIMENSIONAL GRAPHICS DATA, assigned to the assignee herein, discloses such compression.

Thus, there is a need for method and apparatus for decompressing three-dimensional geometry that has been compressed. Preferably, decompression is such that the output data may be passed to rendering hardware directly as drawing instructions. Finally, decompression of three-dimensional geometry should be implementable using hardware, software, or a combination thereof.

The present invention discloses such decompression.

SUMMARY OF THE PRESENT INVENTION

For decompression according to the present invention, three-dimensional geometry is first represented as a generalized triangle mesh, which allows each instance of a vertex in a linear stream to specify an average of between ⅓triangle and 2 triangles. Individual positions, colors, and normals are quantized, with a variable length compression being applied to individual positions, colors, and normals. Quantized values are delta-compression encoded between neighbors to provide vertex traversal orders, and mesh buffer references are created. Histograms of delta-positions, delta-normals and delta-colors are created, after which variable length Huffman tag codes, as well as delta-positions, delta-normals and delta-colors are created. The compressed output binary stream includes the output Huffman table initializations, ordered vertex traversals, output tags, and the delta-positions, delta-normals, and delta-colors.

Decompression of such compressed three-dimensional geometry data may be implemented in hardware, software, or a combination of each. The decompression unit includes an input FIFO that receives compressed data bits and a signal noting size of the incoming data. The FIFO outputs are coupled to an input block state machine and an input block. Outputs from the input block and input block state machine are coupled to a barrel shifter unit. Input block output also is input to Huffman tables that output to the state machine. The state machine output also is coupled to a data path controller whose output is coupled to a tag decoder, and to a normal processor receiving output from the barrel shifter unit. The decompressor unit also includes a position/color processor that receives output from the barrel shifter unit. Outputs from the normal processor and position/color processor are multiplexed to a format converter.

For instructions in the data stream that generate output to the format converter, the decompression unit generates a 12-bit tag that is sent to the tag decoder in parallel with bits for normals that are sent to the format converter. A read-back path is used to read back the internal state of the decompressor unit. The decompressor unit carries out the following procedures:

(1) Fetch the rest of the next instruction, and the first 8 bits of the following instruction;

(2) Using the tag table, expand any compressed value fields to full precision;

(3A) If values are relative, add to current value; otherwise replace;

(3B) If mesh buffer reference, access old values;

(3C) If other command, do housekeeping;

(4) If normal, pass index through ROM table to obtain full values;

(5) Output values in generalized triangle strip form to next stage.

The decompressed stream of triangle data may then be passed to a traditional rendering pipeline, where it can be processed in full floating point accuracy, and thereafter displayed or otherwise used.

Other features and advantages of the invention will appear from the following description in which the preferred embodiments have been set forth in detail, in conjunction with the accompanying drawings.

BRIEF DESCRIPTION OF THE DRAWINGS

FIG. 4I depicts tag and Δ-position data structure;

FIGS. 4J-1 and 4J-2 depict alternative tag and Δ-normal data structure;

FIG. 4K depicts tag and Δ-color data structure;

FIG. 13B depicts a preferred format for entry of the Huffman table data, according to the present invention;

FIG. 14A depicts a vertex instruction, according to the present invention;

FIG. 14B depicts vertex component data formats, according to the present invention;

FIG. 14C depicts the format for the set normal instruction, according to the present invention;

DETAILED DESCRIPTION OF THE PREFERRED EMBODIMENT

A graphics decompressor according to the present invention decompresses three-dimensional graphics objects. Three-dimensional compression of such geometry advantageously permits a reduction in the time needed to transmit the compressed three-dimensional geometry, e.g., over a network, as well a reduction of the space wherein the geometry may be stored, e.g., on a CD-ROM, or the like.

Before describing decompression of compressed three-dimensional graphics, the overall environment in which the present invention may be practiced will be described with respect to FIG. 1.

Figure 1:
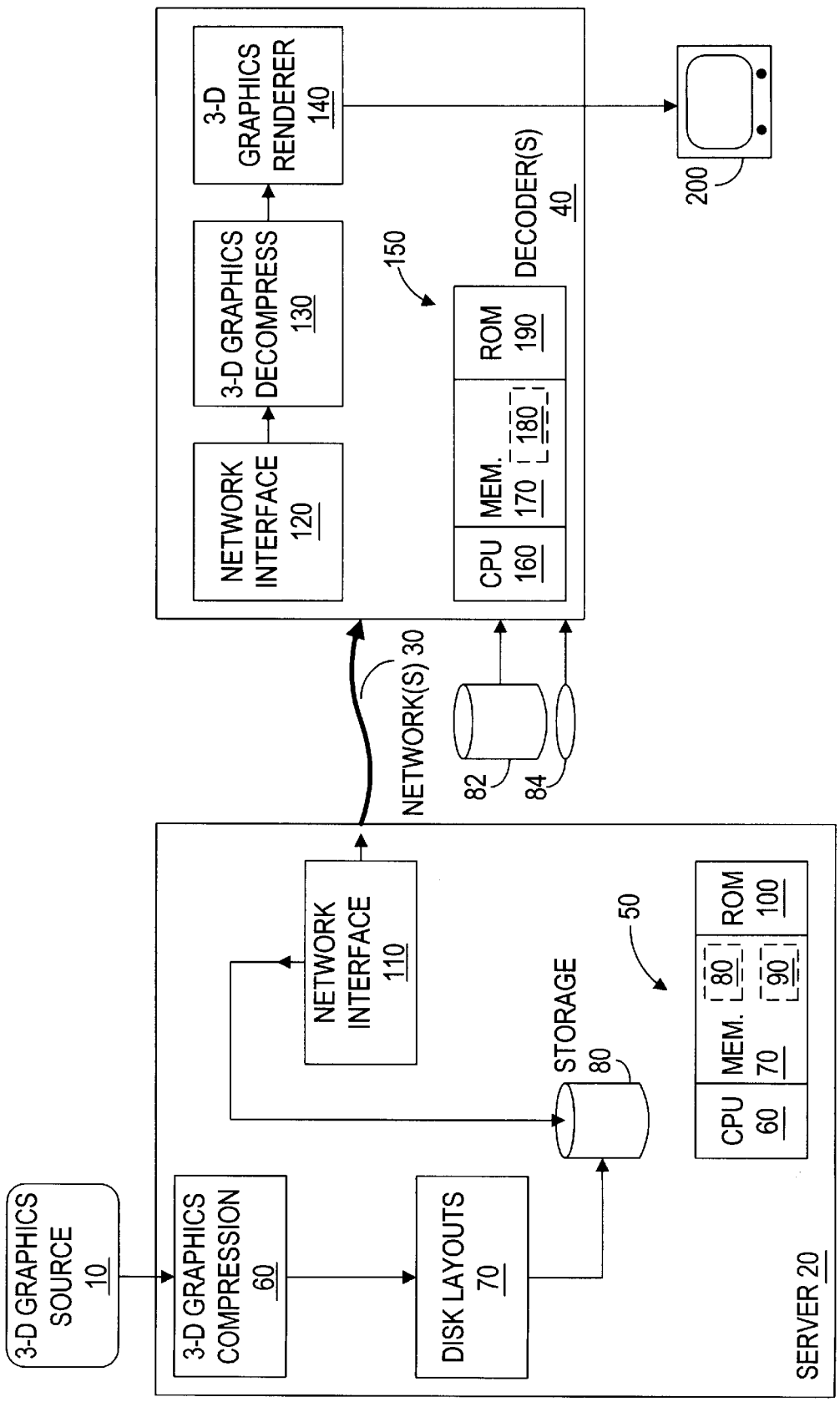
FIG. 1 depicts a generalized network system over which compressed three-dimensional geometry may be transmitted for decompression, according to the present invention, at the receiving end.

FIG. 1 depicts a generalized network over which three-dimensional compressed geometry data may be transmitted, and decompressed using software, hardware, or a combination of each at the receiving end. Of course, decompression of three-dimensional graphics compression according to the present invention may be practiced upon compressed data that is presented other than via a network, e.g., compressed data stored in a memory, on a CD-ROM, and the like.

As shown in FIG. 1, a source of three-dimensional graphics data 10 may be coupled to a server or encoder system 20 whose processed and compressed output is coupled over one or more networks 30 to one or more target clients or decoder systems 40. The network may be homogeneous, heterogeneous, or point-to-point.

Server 20 includes a central processing unit 50 that includes a central processor unit per se ("CPU") 60 with associated main memory 70, a mesh buffer 80, a memory portion 90 that may include a compression algorithm, and a region of read-only-memory ("ROM") 100. Alternatively, compression according may be carried out in hardware as opposed to software. ATTACHMENT 1 is a copy of a code listing for such a compression algorithm as described in the above-referenced patent application. Server 20 also includes a three-dimensional graphics compression unit 60, whose compressed output data is arranged by a disk layout unit 70 for storage onto storage disk unit 80, which may include one or more CD-ROMs. The server communicates over the network(s) 30 via network interface unit 110. Those skilled in the art will appreciate that server 20 may include a mechanism for arbitrating between a plurality of client-decoder requests for compressed data.

As described in applicant's patent application Ser. No. 08/511,294 filed Aug. 4, 1995, entitled METHOD AND APPARATUS FOR GEOMETRIC COMPRESSION OF THREE-DIMENSIONAL GRAPHICS DATA, assigned to the assignee herein, lossy compression of three-dimensional geometric data can produce ratios of 6:1 to 10:1, with little loss in displayed object quality. The following portions of this Specification will describe compression, as set forth in the above-referenced patent application, to facilitate a better understand of decompression, according to the present invention.

In a network environment, at the receiving end, decoder systems(s) 40 include a network interface unit 120, a unit 130, according to the present invention, that decompresses three-dimensional graphics data, and whose output is coupled to a three-dimensional graphics rendering unit 140. System 40 further comprises a central processing system 150 that includes a CPU 160, memory 170, a portion of which 180 may include decompression software, and ROM 190. Compressed three-dimensional graphics may advantageously be decompressed using software, hardware, or a combination of each. The decompressed output from decoder 40 further may be coupled to a viewer 200, or to another system requiring the decompressed graphics. Of course, unit 40 may be a standalone unit, into which pre-compressed three-dimensional graphics are coupled from storage 82, disks or CD-ROM 84, or the like, for decompression. Unit 40 may, for example, comprise a computer or workstation.

Assuming that three-dimensional graphics compression unit 60 functions as described in applicant's above-noted patent application, triangle data will have first been converted into a generalized triangle mesh. For a given fixed capacity of storage medium 80, a triangle mesh data structure is a near-optimal representation of triangle data. In the preferred embodiment, three-dimensional graphics object may be represented as three-dimensional triangular data, whose format after conversion causes each linear strip vertex, on average, to specify from about ⅓ triangles to about 2 triangles. Further, such triangle strip structure permits extraction of the compressed geometry by a single monotonic scan over the vertex array data structure.

Figure 2:
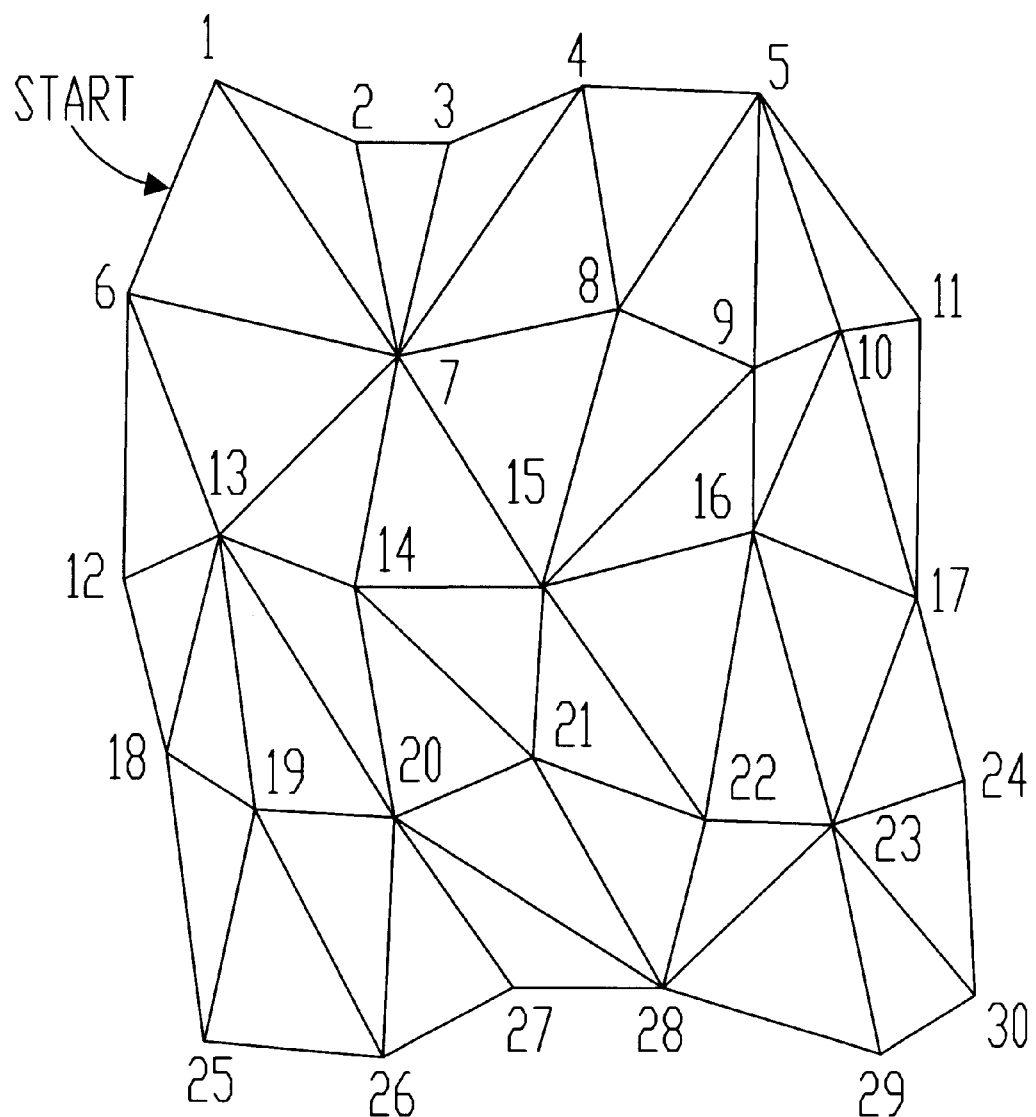
FIG. 2 depicts a generalized triangular mesh data structure, and generalized mesh buffer representation of surface geometry.

FIG. 2 depicts a generalized triangular mesh data structure, and generalized mesh buffer representation of surface geometry. Such a mesh data structure may be used in three-dimensional geometry compression, although by confining itself to linear strips, a generalized triangle strip format wastes a potential factor of two in space. The geometry shown in FIG. 2, for example, can be represented by one triangle strip, but many interior vertices will appear twice in the strip.

In FIG. 2, a generalized triangle strip may be defined as follows, where the R denotes restart, O denotes replace oldest, M denotes replace middle, and a trailing letter p denotes push into mesh buffer. The number following a capital letter is a vertex number, and a negative number is the mesh buffer reference, in which −1 denotes the most recent pushed vertex.

R6, O1, O7, O2, O3, M4, M8, O5, O9, O10, M11 M17, M16, M9, O15, O8, O7, M14, O13, M6, O12, M18, M19, M20, M14, O21, O15, O22, O16, O23, O17, O24, M30, M29, M28, M22, O21, M20, M27, O26, M19, O25, O18

Using the same nomenclature, a generalized triangle mesh may be defined as follows:

R6p, O1, O7p, O2, O3, M4, M8p, O5, O9p, O10, M11, M17p, M16p, M−3, O15p, O−5, O6, M14p, O13p, M9, O12, M18p, M19p, M20p, M−5, O21p, O−7, O22p, O−9, O23, O−10, O−7, M30, M29, M28, M−1, O−2, M−3, M27, O26, M−4, O25, O−5

It is to be noted that a vertex reference advantageously can be considerably more compact (e.g., be represented by fewer bits) than a full vertex specification.

Three-dimensional geometry compression explicitly pushes old vertices (e.g., vertices with a trailing letter "p" above) into a queue associated with mesh buffer memory 80 (see FIG. 1). These old vertices will later be explicitly referenced when the old vertex is desired again. This approach provides a fine control that supports irregular meshes of nearly any shape. Buffer memory 80 has finite length, and in practice a maximum fixed queue length of 16 is used, which requires a 4-bit index. With respect to the compression of three-dimensional graphics, the term "mesh buffer" shall refer to this queue, and the expression "generalized triangle mesh" will refer to a combination of generalized triangle strips and mesh buffer references.

The fixed size of mesh buffer 80 requires all tessellators/re-strippers for compressed geometry to break-up any runs longer than sixteen unique references. However, as geometry compression typically will not be programmed directly at the user level but rather by sophisticated tessellators/reformatters, a non-onerous restriction. Sixteen old vertices can in fact permit avoiding re-specification of up to about 94% of the redundant geometry.

FIG. 2 also is an example of a general mesh buffer representation of surface geometry. Geometry compression language supports the four vertex replacement codes of generalized triangle strips, namely: replace oldest, replace middle, restart clockwise, and restart counterclockwise. Further, the language adds an additional bit in each vertex header to indicate whether or not this vertex should be pushed into the mesh buffer. In one embodiment, the mesh buffer reference command has a 4-bit field to indicate which old vertex should be re-referenced, along with the 2-bit vertex replacement code. Mesh buffer reference commands do not contain a mesh buffer push bit; old vertices can only be recycled once.

In practice, geometry rarely is comprised purely of positional data and in general, a normal, and/or color, and/or texture map coordinate are also specified per vertex. Accordingly, entries into mesh buffer 80 contain storage for all associated per-vertex information, specifically including normal and color and/or texture map coordinate.

Figure 4A:
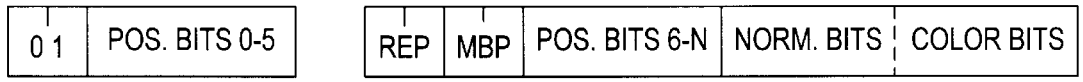
FIG. 4A depicts a vertex command in a geometry compression instruction set.

For maximum storage space efficiency, when a vertex is specified in the data stream, per vertex normal and/or color information preferably is directly bundled with the position information. Preferably, such bundling is controlled by two state bits: bundle normals with vertices (BNV), and bundle colors with vertices (BCV). FIG. 4E depicts a command structure including bits, among others. When a vertex is pushed into the mesh buffer, these bits control if its bundled normal and/or color are pushed as well.

It should be noted that the compression technique described in the above-referenced patent application is not limited to triangles, and that vectors and dots may also be compressed. Lines, for example, are a subset of triangles, in which replacement bits are MOVE and DRAW. An output vertex is then a vertex that represents one end point of a line whose other vertex is the most recently, previously omitted vertex. For dots, the replacement bits are DRAW, and an output vertex is the vertex.

When CPU 52 executes a mesh buffer reference command, this process is reversed. That is, the two bits specify whether a normal and/or color should be inherited, or read, from the mesh buffer storage 80, or obtained from the current normal or current color. Software 58 preferably includes explicit commands for setting these two current values. An exception to this rule exists, however, when an explicit "set current normal" command is followed by a mesh buffer reference, with the BNV state bit active. In this situation, the former overrides the mesh buffer normal, to allow compact representation of hard edges in surface geometry. Analogous semantics are also defined for colors, allowing compact representation of hard edges in surface colors.

Two additional state bits control the interpretation of normals and colors when the stream of vertices is converted into triangles. A replicate normals over triangle (RNT) bit indicates that the normal in the final vertex that completes a triangle should be replicated over the entire triangle. A replicate colors over triangle (RCT) bit is defined analogously, as shown in the command structure of FIG. 4E.

Compression of image xyz positions will now be described. Use of the 8-bit exponent associated with 32-bit IEEE floating-point numbers allows positions to range in size from sub-atomic particles to billions of light years. But for any given tessellated object, the exponent is actually specified just once by a current modeling matrix, and object geometry is effectively described within a given modeling space using only a 24-bit fixed-point mantissa. In many cases far fewer bits are needed for visual acceptance, and the geometry compression language preferably supports variable quantization of position data down to one bit.

At the other extreme, empirical visual tests as well as well as consideration of semiconductor hardware implementation indicate that no more than 16 bits of precision per component of position is necessary for nearly all cases.

Assume, however, that the position and scale of local modeling space per object are specified by full 32-bit or 64-bit floating-point coordinates. Using sufficient numerical care, multiple such modeling spaces may be combined together to form seamless geometry coordinate systems with much greater than 16-bit positional precision.

Most geometry is local. Thus, within a 16-bit (or less) modeling space for each object, the difference ($\Delta$) between adjacent vertices in the generalized mesh buffer stream is likely to be less than 16 bits in significance. If desired, one may construct a histogram representing bit length of neighboring position $\Delta$'s in a batch of geometry, and based upon this histogram assign a variable length code to compactly represent the vertices. As will be described, preferably customized Huffman coding is used to encode for the positional $\Delta$'s in the geometry compression.

Compression of red-blue-green-alpha ("RBGA") colors will now be described. Color data are treated similarly to positions, but with a smaller maximum accuracy. Thus, RGB $\Delta$ color data are first quantized to 12-bit unsigned fraction components that are absolute linear reflectivity values (in which 1.0 represents 100% reflectivity). An additional parameter allows color data effectively to be quantized to any amount less than 12 bits. By way of example, colors may all be within a 5-5-5 RGB color space, as shown in FIG. 4C. The optional $\Delta$ field is controlled by a color A present ("CAP") state bit shown in FIG. 4E. On the final rendered image individual pixel colors are still interpolated between the quantized vertex colors, and also typically are subject to lighting.

In practice, the same $\Delta$-coding may be used for color components and for positions. The area of color data compression is where geometry compression and traditional image compression confront the most similar problems. However, many advanced image compression techniques may be avoided for geometry color compression because of the difference in focus.

For example, the JPEG image compression standard relies upon assumptions about viewing of the decompressed data that cannot be made for geometry compression. For example, in image compression, it is known a priori that the pixels appear in a perfectly rectangular array, and that when viewed, each pixel subtends a narrow range of visual angles. By contrast, in geometry compression, the relationship between the viewer and the rasterized geometry is unpredictable.

In image compression, it is known that the spatial frequency of the displayed pixels upon on the viewer's eyes is likely higher than the color acuity of the human visual system. For this reason, colors are commonly converted to YUV space so that the UV color components can be represented at a lower spatial frequency than the Y (intensity) component. Usually digital bits representing sub-sampled UV components are divided among two or more pixels. However, geometry compression cannot take advantage of this because there is no fixed display scale of the geometry relative to the viewer's eye. Further, given that compressed triangle vertices are connected to four to eight or more other vertices in the generalized triangle mesh, there is no consistent way of sharing "half" the color information across vertices.

Similar arguments apply for the more sophisticated transforms used in traditional image compression, such as the discrete cosine transform. These transforms assume a regular (rectangular) sampling of pixel values, and require a large amount of random access during decompression.

It is known in the art to use pseudo-color look-up tables, but such tables would required a fixed maximum size, and would represent a relatively expensive resource for real-time processing. While pseudo-color indices could yield slightly higher compression ratios for certain scenes, the RGB model is more generalized and considerably less expensive to implement.

In an RGB model, RGB values are represented as linear reflectance values. Theoretically, if all effects of lighting could be known a priori, one or two representation bits could be dropped if the RGB components had been represented in a nonlinear, or perceptually linear space (sometime referred to as gamma corrected space). In practice, lighting effects tend not to be predictable, and on-the-fly conversion from nonlinear light to linear light would require considerable hardware resources.

The compression of surface normals will now be described. Traditionally 96-bit normals (three 32-bit IEEE floating-point numbers) are used in calculations to determine 8-bit color intensities. Theoretically, 96 bits of information could be used to represent $2^{96}$ different normals, spread evenly over the surface of a unit sphere. The resultant extremely high accuracy represents a normal projecting in any direction every $2^{-46}$ radians.

But for IEEE floating-point normalized normals, the exponent bits are effectively unused. Given the constraint $N_x^2+N_y^2+N_z^2=1$, at least one of $N_x$, $N_y$, or $N_z$ must be in the 0.5 to 1.0 range. During rendering, this normal will be transformed by a composite modeling orientation matrix:

$$N'_x=N_x \cdot T_{0,0}+N_y \cdot T_{0,1}+N_z \cdot T_{0,2}$$

$$N'_y=N_x \cdot T_{1,0}+N_y \cdot T_{1,1}+N_z \cdot T_{1,2}$$

$$N'_z=N_x \cdot T_{2,0}+N_y \cdot T_{2,1}+N_z \cdot T_{2,2}$$

Assuming a typical implementation in which lighting is performed in world coordinates, the view transform is not involved in the processing of normals. If the normals have been pre-normalized, then to avoid redundant re-normalization of the normals, the composite modeling transformation matrix T is typically pre-normalized to divide out any scale changes. Thus:

$$T_{0,0}^2+T_{1,0}^2+T_{2,0}^2=1, \text{ etc.}$$

During normal transformation, floating-point arithmetic hardware effectively truncates all additive arguments to the accuracy of the largest component. The result is that for a normalized normal undergoing transformation by a scale preserving modeling orientation matrix, the numerical accuracy of the transformed normal value is reduced to no more than 24-bit fixed-point accuracy in all but a few special cases.

By comparison, even 24-bit normal components would still provide higher angular accuracy than the repaired Hubble space telescope, and in practice, some systems utilize only 16-bit normal components. In empirical tests with 16-bit normal components, results from an angular density of 0.01 radians between normals (e.g., about 100,000 normals distributed over a unit sphere) are not visually distinguishable from finer representations. In rectilinear space, these normals still require high representation accuracy and in practice, 16-bit components including one sign and one guard bit represents a good design choice. This still requires 48 bits to represent a normal, but since only 100,000 specific normals are of interest, theoretically a single 17-bit index could denote any of these normals.

The use of normals as indices, and the resultant advantages provided will now be described. One method of converting an index of a normal on the unit sphere back into a $N_x$, $N_y$, $N_z$ value is with a table look-up, the table being loaded into memory 70 perhaps. Although table size is potentially large, the requisite size can be substantially reduced by taking advantage of a 48-way symmetry present in the unit sphere.

Figure 3:
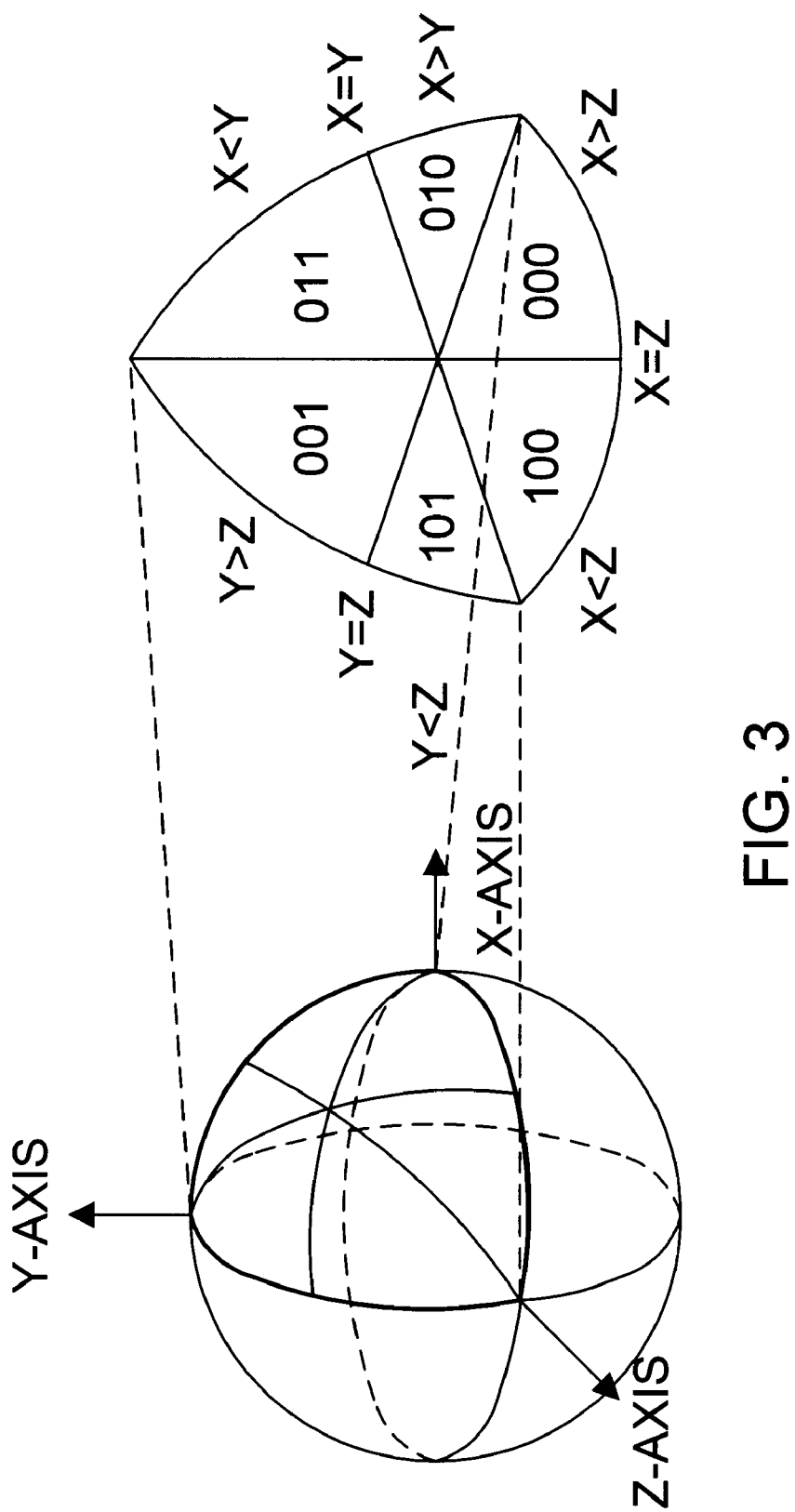
FIG. 3 depicts six-way sign-bit and eight-way octant symmetry in a unit sphere, used to provide forty-eight way reduction in table look-up size.

More particularly, as shown by FIG. 3, the unit sphere is symmetrical by sign bits in the eight quadrants by sign bits. By allowing three of the normal representation bits to be the three sign bits of the xyz components of a normal, it then is only necessary to represent one eighth of the unit sphere.

Each octant of the unit sphere can be divided into six identical components by folding about the planes x=y, x=z, and y=z. The six possible sextants are encoded with another three bits, which leaves only 1/48 of the sphere remains to be represented.

Utilizing the above-noted symmetry reduces the look-up table size by a factor of 8×6=48. Instead of storing 100,000 entries, the look-up table need store only about 2,000 entries, a size small enough to be an on-chip ROM look-up table, stored perhaps within ROM 59 (see FIG. 1). Indexing into the look-up table requires 11 address bits, which when added to the previously described two 3-bit fields results in a 17-bit field to describe all three normal components.

Representing a finite set of unit normals is equivalent to positioning points on the surface of the unit sphere. Although no perfectly equal angular density distribution exists for large numbers of points, many near-optimal distributions exist. Theoretically, a distribution having the above-described type of 48-way symmetry could be used for the decompression look-up table associated with the three-dimensional geometry decompression unit 130 (see FIG. 1).

However, several additional constraints mandate a different choice of encoding. First, a scalable density distribution is desired, e.g., a distribution in which setting in the look-up table more low order address bits to "0" still results in fairly even normal density on the unit sphere. Otherwise a different look-up table for every encoding density would be required. Secondly, a Δ-encodable distribution is desired in that adjacent vertices in geometry statistically have normals that are nearby on the surface of the unit sphere. Nearby locations on the two-dimensional space of the unit-sphere surface are most succinctly encoded by a two-dimensional offset. It is desirable to have a distribution in which such a metric exists. Finally, although computational costs associated with the normal encoding process are not critically important, distributions having lower encoding costs are still preferred.

Compression according to the above-referenced patent application utilizes a distribution having a regular grid in the angular space within one sextant of the unit sphere. As such, rather than a monolithic 11-bit index, all normals within a sextant are advantageously represented with two 6-bit orthogonal angular addresses. This configuration then revises the previous bit-total to 18-bits. As was the case for positions and colors, if more quantization of normals is acceptable, these 6-bit indices can be reduced to fewer bits, and thus absolute normals can be represented using anywhere from 18 to as few as 6 bits. However, as described below, this space preferably is Δ-encoded to further reducing the number of bits required for high quality representation of normals.

Normal encoding parameterization will now be described. Points on a unit radius sphere are parameterized using spherical coordinates by angles θ and φ, where θ is the angle about the y axis and φ is the longitudinal angle from the y=0 plane. Equation (1) governs mapping between rectangular and spherical coordinates as follows:

$$x=\cos\theta\cos\phi\ y=\sin\phi\ z=\sin\theta\cos\phi \tag{1}$$

Points on the sphere are folded first by octant, and then by sort order of xyz into one of six sextants. All table encoding takes place in the positive octant in the region bounded by the half spaces:

$$x \geq z\ z \geq y\ y \geq 0$$

As shown in FIG. 3, the described triangular-shaped patch runs from 0 to π/4 radians in θ, and from 0 to a maximum 0.615479709 radians in φ.

Quantized angles are represented by two n-bit integers $\hat{\theta}_n$ and $\hat{\theta}_n$, where n is in the range of 0 to 6. For a given n, the relationship between indices θ and φ is:

$$\Theta(\hat{\theta}_n) = \arcsin\tan\frac{(\phi_{max} \cdot (n - \hat{\theta}_n))}{2^n} \tag{2}$$

$$\phi(\hat{\phi}_n) = \frac{\phi_{max} \cdot \phi}{2^n}$$

Equations (2) show how values of $\hat{\theta}_n$ and $\hat{\phi}_n$ can be converted to spherical coordinates θ and φ, which in turn can be converted to rectilinear normal coordinate components via equation (1).

To reverse the process, e.g. to encode a given normal N into $\hat{\theta}_n$ and $\hat{\phi}_n$, one cannot simply invert equation (2). Instead, the N must be first folded into the canonical octant and sextant, resulting in N'. Then N' must be dotted with all quantized normals in the sextant. For a fixed n, the values of $\hat{\theta}_n$ and $\hat{\theta}_n$ that result in the largest (nearest unity) dot product define the proper encoding of N. Other, more efficient methods for finding the correct values of $\hat{\theta}_n$ and $\hat{\phi}_n$ exist, for example indexing through the table to set φ, and then jumping into θ.

At this juncture, the complete bit format of absolute normals can be given. The uppermost three bits specify the octant, the next three bits the sextant, and finally two n-bit fields specify $\hat{\theta}_n$ and $\hat{\phi}_n$. The 3-bit sextant field takes on one of six values, the binary codes for which are shown in FIG. 3.

Some further details are in order. The three normals at the corners of the canonical patch are multiply represented, namely 6, 8, and 12 times. By employing the two unused values of the sextant field, these normals can be uniquely encoded as 26 special normals.

This representation of normals is amenable to Δ-encoding, at least within a sextant, although with some additional work, this can be extended to sextants that share a common edge. The Δ code between two normals is simply the difference in $\hat{\theta}_n$ and $\hat{\phi}_n$, namely $\Delta\hat{\theta}_n$ and $\hat{\phi}_n$.

In the above-described patent application, compression tags are used, with a variation of a conventional Huffman algorithm. The Huffman compression algorithm takes in a set of symbols to be represented, along with frequency of occurrence statistics (e.g., histograms) of those symbols. From this, variable length, uniquely identifiable bit patterns are generated that allow these symbols to be represented with a near-minimum total number of bits, assuming that symbols do occur at the frequencies specified.

Many compression techniques, including JPEG, create unique symbols as tags to indicate the length of a variable-length data-field that follows. This data field is typically a specific-length delta value. Thus, the final binary stream consists of (self-describing length) variable length tag symbols, each immediately followed by a data field whose length is associated with that unique tag symbol.

In the referenced patent application, binary format for geometry compression uses this technique to represent position, normal, and color data fields. For geometry compression, these <tag, data> fields are immediately preceded by a more conventional computer instruction set op-code field. These fields, along with potential additional operand bits, will be referred to as geometry instructions (see FIGS. 4A–4K).

Traditionally, each value to be compressed is assigned its own associated label, e.g. an xyz Δ position would be represented by three tag-value pairs. But since the Δxyz values are not uncorrelated, a denser, simpler representation can be attained. In general, the xyz Δ's statistically point equally in all directions in space. Thus, if n is the number of bits needed to represent the largest of the Δ's, then statistically the other two Δ values require an average of n−1.4 bits for their representation. In practice, a single field-length tag may be used to indicate the bit length of Δx, Δy, and Δz.

Unfortunately, using this approach prevents taking advantage of another Huffman technique to save somewhat less than one more bit per component. However, the implemented embodiment outweighs this disadvantage by not having to specify two additional tag fields (for Δy and Δz). A further advantage is that using a single tag field permits a hardware decompression engine to decompress all three fields in parallel, if desired.

Similar arguments hold for Δ's of RGBα values, and accordingly a single field-length tag is used to indicate bit-length of the R, G, B and, if present, α, fields.

Absolute and Δ normals are also parameterized by a single value (n) that can be specified by a single tag. To facilitate high-speed, low-cost hardware implementations, the length of the Huffman tag field may be limited to six bits, a relatively small value. A 64-entry tag look-up table allows decoding of tags in one clock cycle. One table exists for positions, another table exists for normals, and yet another table exists for colors (and optionally, also for texture coordinates). Each table contains the length of the tag field, the length of the data field(s), a data normalization coefficient, and an absolute/relative bit.

For reasonable hardware implementation, an additional complication must be addressed. As described below, all instruction are broken-up into an eight-bit header, and a variable length body, sufficient information being present in the header to determine the body length. But the header of one instruction must be placed in the data stream before the body of the previous instruction to give the hardware time to process the header information. For example, the sequence . . . B0 H1B1 H2B2 H3 . . . has to be encoded as . . . H1 B0 H2 B1 H3 B2 . . .

The geometry compression instruction set disclosed in the above-referenced patent application will now be described with respect to FIGS. 4A–4K. FIG. 4A depicts a vertex command that specifies a Huffman compressed Δ-encoded position, as well as possibly a normal and/or color, depending on bundling bits (BNV and BCV). Two additional bits specify a vertex replacement code (REP), and another bit controls mesh buffer pushing of this vertex (MBP).

Figure 4B:
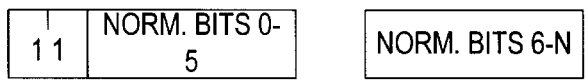
FIG. 4B depicts a normal command in a geometry compression instruction set.
Figure 4C:
FIG. 4C depicts a color command in a geometry compression instruction set.

As shown in FIG. 4B, a normal command specifies a new current normal and the color command shown in FIG. 4C depicts a new current color. The normal command and color command each use Huffman encoding of Δ values.

Figure 4D:
FIG. 4D depicts a mesh buffer reference command in a geometry compression instruction set.
Figure 4E:
FIG. 4E depicts a set state instruction in a geometry compression instruction set.

The mesh buffer reference command structure is shown in FIG. 4D. The mesh buffer reference command allows any of the sixteen most recently pushed vertices (and associated normals and/or colors) to be referenced as the next vertex. As further shown in FIG. 4D, A 2-bit vertex replacement ("REP") code is also specified.

FIG. 4E depicts the set state instruction that updates the five state bits: RNT, RCT, BNV, BCV, and CAP.

Figure 4F:
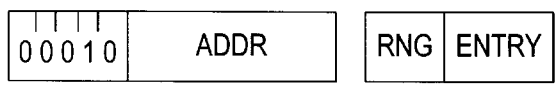
FIG. 4F depicts a set table command instruction in a geometry compression instruction set.

FIG. 4F depicts a set table command, which is used to set entries to the entry value specified in one of the three Huffman decoding tables (Position, Normal, or Color).

Figure 4G:
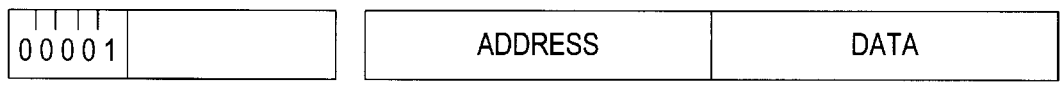
FIG. 4G depicts a pass through command instruction in a geometry compression instruction set.

FIG. 4G depicts a passthrough command that allows additional graphics state not controlled directly by geometry compression to be updated in-line.

Figure 4H:
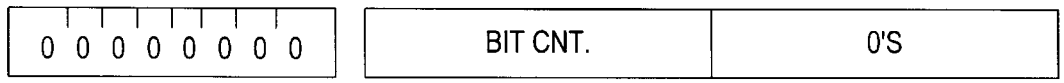
FIG. 4H depicts a variable length no-op command instruction in a geometry compression instruction set.

FIG. 4H depicts a variable length no-op ("VNOP") command that allows fields within the bit stream to be aligned to 32-bit word boundaries. This permits aligned fields to be efficiently patched at run-time by the general CPU 52.

FIGS. 4I, 4J-1 and 4J-2 and 4K respectively depict tag and Δ-position data structure, tag and Δ-normal data structure, and tag and Δ-color data structure. In FIGS. 4J and 4K, either absolute values of x, y, z are used, or delta values of x, y, and z are to be used.

Of course, other instruction sets may instead be used to compress three-dimensional geometry.

The ratio of the time required for compression relative to decompression can be important. In practice, it is acceptable for off-line image compression to take up to perhaps sixty-times more time than decompression, but for real-time video conferencing, the ratio should be one.

Advantageously, geometry compression does not have this real-time requirement. Even if geometry is constructed on the fly, most geometry creating techniques, e.g., CSG, require orders of magnitude more time than needed for displaying geometry. Also, unlike continuous images found in movies, in most applications of geometry compression a compressed three-dimensional object will be displayed for many sequential frames before being discarded. Should the three-dimensional object require animating, animation is typically done with modeling matrices. Indeed for a CD-based game, it is quite likely that an object will be decompressed billions of times by customer-users, but will have been compressed only once by the authoring company.

Like some other compression systems, geometry compression algorithms can have a compression-time vs. compression-ratio trade-off. For a given quality target level, as allowable time for compression increases, the compression ratio achieved by a geometry compression system increases. There exists a corresponding "knob" for quality of the resulting compressed three-dimensional object, and lower the quality knob, the better the compression ratio achieved.

Aesthetic and subjective judgment may be applied to geometry compression. Some three-dimensional objects will begin to appear bad when target quantization of normals and/or positions is slightly reduced, whereas other objects may be visually unchanged even with a large amount of quantization. Compression can sometimes cause visible artifacts, but in other cases may only make the object look different, not necessarily lower in quality. In one experiment by applicant, an image of an elephant actually begin to appear more realistic, with more wrinkle-like skin, as the image normals were quantized more. Once a model has been created and compressed, it can be put into a library, to be used as three-dimensional clip-art at the system level.

While many aspects of geometry compression are universal, the above-described geometry compression instruction set has been somewhat tailored to permit low-cost, high-speed hardware implementations. (It is understood that a geometry compression format designed purely for software decompression would be somewhat different.). The described geometry compression instruction set is especially amenable to hardware implementation because of the one-pass sequential processing, limited local storage requirements, tag look-up (as opposed to a conventional Hamming bit-sequential processing), and use of shifts, adds, and look-ups to accomplish most arithmetic steps.

Figure 5:
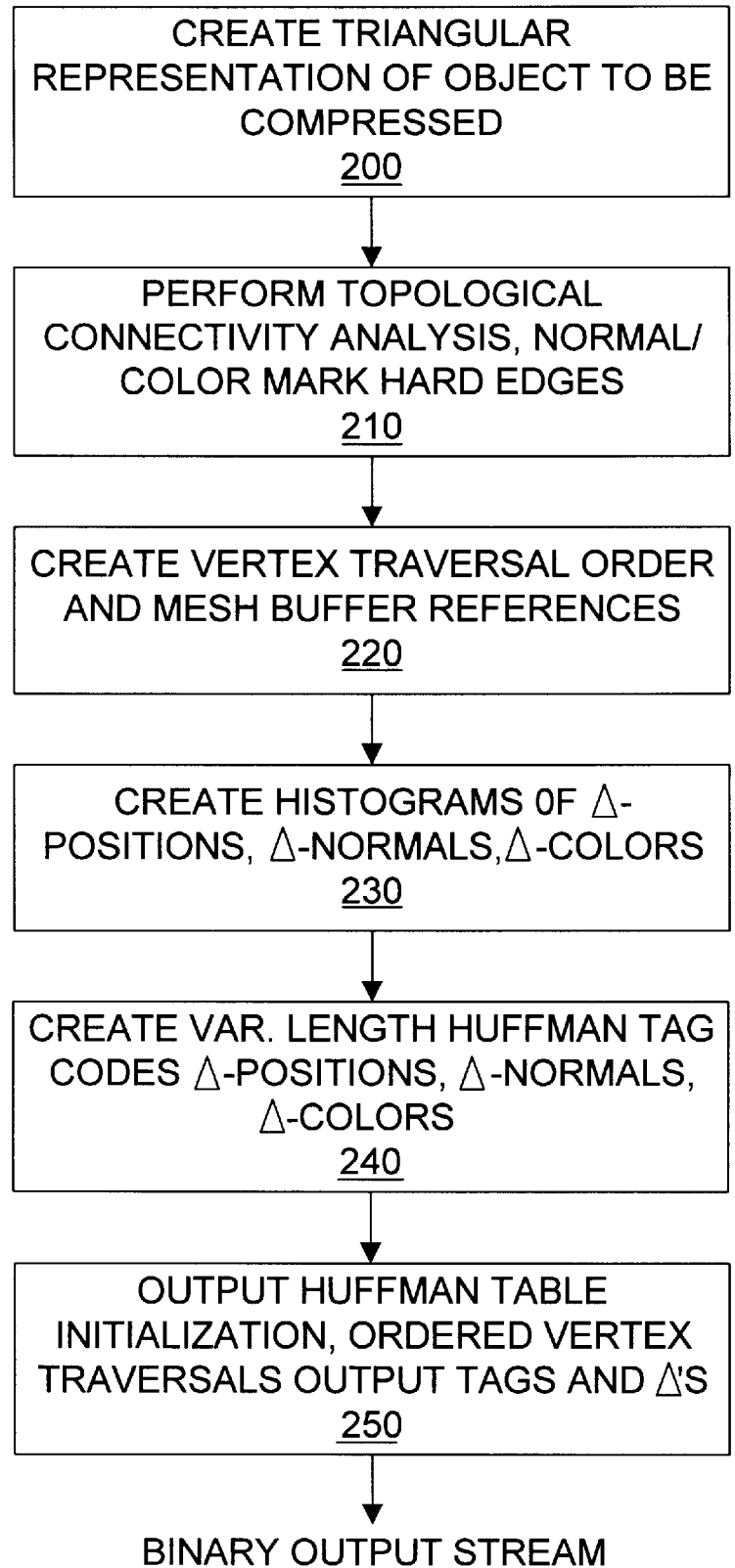
FIG. 5 is a flowchart of method steps in a geometry compression algorithm.

FIG. 5 is a flowchart outlining method steps in a geometry compression algorithm routine, described in the above-referenced patent application, with which the present decompression invention may be used. Such routine may be stored in memory 80 and executed under control of CPU 60 (see FIG. 1).

At step 200, an object is represented by an explicit group of triangles to be compressed, along with quantization thresholds for positions, normals, and colors. At step 210, a topological analysis of connectivity is made, and hard edges are marked in normals and/or color, if such information is not already present.

At step 220, vertex traversal order and mesh buffer references are created, and at step 230 histograms of Δ-positions, Δ-normals, and Δ-colors is created. At step 240, separate variable length Huffman tag codes are assigned for the Δ-positions, Δ-normals, and Δ-colors, based upon histographs.

At step 250, a binary output stream is generated by first outputting Huffman table initialization, after which the vertices are traversed in order. Appropriate tags and Δ's are output for all values.

Applicant has implemented a Wavefront OBJ format compressor that supports compression of positions and normals, and creates full generalized triangle strips, but does not yet implement a full meshifying algorithm. Future embodiments will explore variable precision geometry, including fine structured updates of the compression tables. The current compressor expends time calculating geometric details already known to the tessellator, and ultimately it is hoped to generate compressed geometry directly. However, even its present unoptimized state, applicant's software can compress about 3,000 triangles/second in many cases.

The present invention is directed to decompressing three-dimensional compressed geometry, at the user end of FIG. 1. ATTACHMENT 2 is a listing of an algorithm for decompression, according to the present invention. Briefly, in general, an applicable geometry decompression algorithm according to the present invention may be outlined as follows:

(1) Fetch the rest of the next instruction, and the first 8 bits of the following instruction;

(2) Using the tag table, expand any compressed value fields to full precision;

(3A) If values are relative, add to current value; otherwise replace;

(3B) If mesh buffer reference, access old values;

(3C) If other command, do housekeeping.

(4) If normal, pass index through ROM table to obtain full values.

(5) Output values in generalized triangle strip form to next stage.

Figure 6:
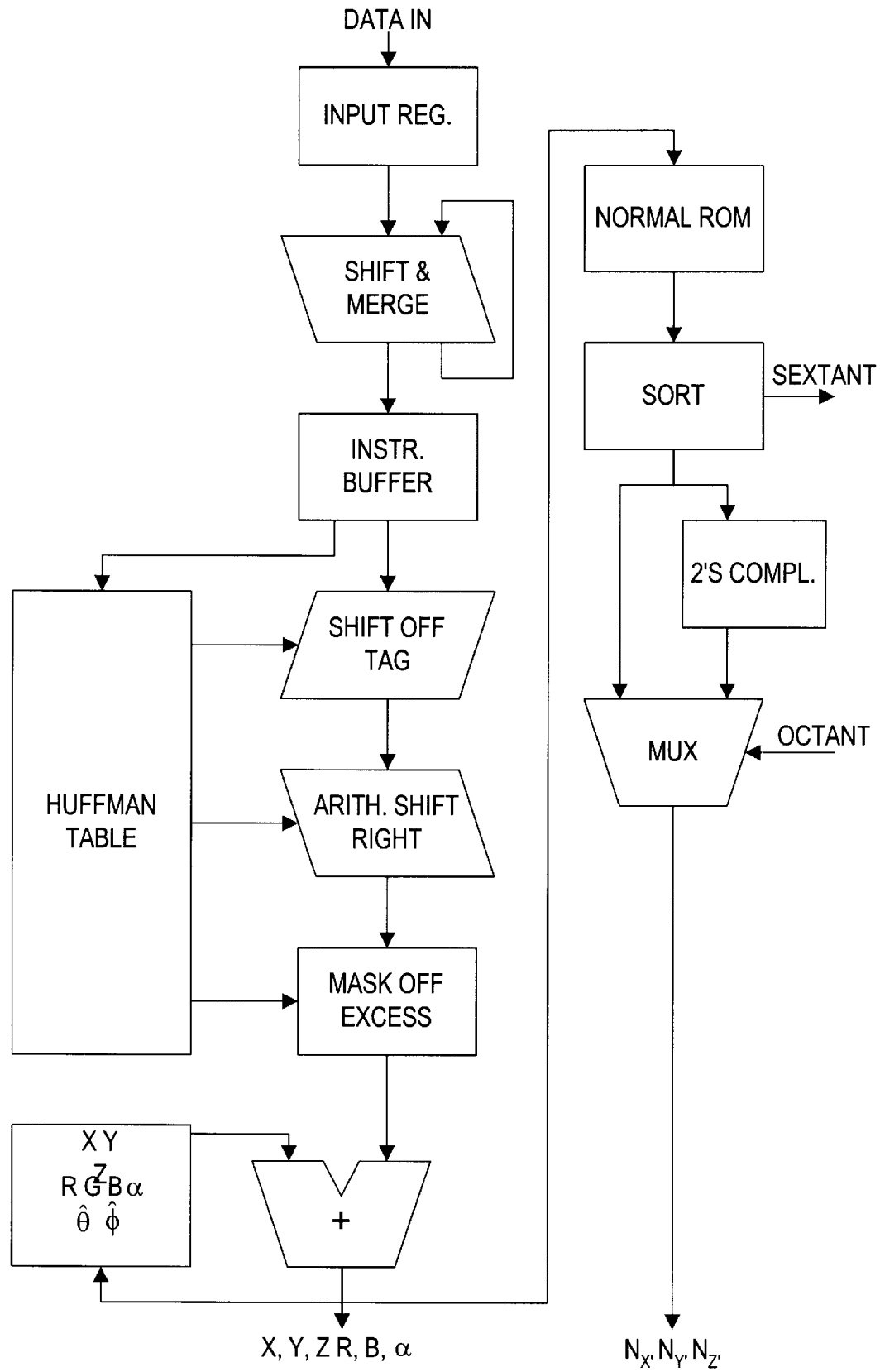
FIG. 6 is a simplified block diagram of decompressor hardware, according to the present invention.

In the preferred embodiment, a software embodiment of applicant's decompressor decompresses compressed geometry at a rate of about 10,000 triangles/second. A simplified overall block diagram of decompression according to the present invention is shown in FIG. 6. A hardware implementation of a decompressor according to the present invention can decompress in the range of tens of millions of triangles/second, which rate may be substantially expanded.

Before describing decompression, it is helpful to examine the results of the above-described compression techniques. Table 1, shown below, describes these results for several graphical objects: a triceratops, a Spanish galleon, a Dodge Viper, a '57 Chevy, and an insect. Generally speaking, Table 1 shows that positional quantization much above 24 bits (from an original 32 bits per x/y/z coordinate) has no significant visible effects unless zooming is performed on the object. Positional quantization to 24 bits is denoted herein as "P72" (24×3). Furthermore, normal coordinates may be reduced from 96 bits (32 bits per coordinate) to as little as 36 bits (12 bits per coordinate) with little visible change. Normal quantization to 12 bits per coordinate is denoted herein as "N36" (12×3). While the location of specular highlights may differ slightly with normal quantization, it is not visually apparent that such changes are reductions in quality.

Table 1 summarizes compression and other statistics for these objects. Column 1 notes the object in question, column 2 represents the number of Δ's, and column three the Δ-strip length. The fourth column represents system overhead per vertex (overhead being everything beyond position tag/data, and normal tag/data). The "xyz quant" column denotes quantization thresholds, and the sixth column depicts the number of bits/xyz. "Bits/tri" ninth column depicts bits per triangle.

The results in Table 1 are measured actual compression data except for estimated mesh buffer results, which are shown in parenthesis. No actual mesh buffer results were present in that applicant's prototype software compressor did not yet implement a full meshifying algorithm. The estimate (in parenthesis) assumes a 46% hit ratio in the mesh buffer.

In Table 1, the right-most column shows compression ratio performance achieved over existing executable geometry formats. Although total byte count of the compressed geometry is an unambiguous number, in stating a compression ratio some assumptions must be made about the uncompressed executable representation of the object. Applicant assumed optimized generalized triangle strips, with both positions and normals represented by floating-point values to calculate "original size" data for Table 1.

To demonstrate the effect of pure 16-bit fixed point simple strip representation, Table 1 also shows byte count for the mode of OpenGL. As shown, average strip length decreased in the range of 2–3. Few if any commercial products take advantage of generalized triangle strips, and thus Table 1 considerably understates potential memory space savings.

TABLE 1

| Obj. name | #Δ's | Δstp len. | ovrhd/ vertex | xyz quant | bits/ xyz | norm quant | bits/ norm | bits/ tri | org'l size (bytes) | comp. size (bytes) | comp. ratio |
|---|---|---|---|---|---|---|---|---|---|---|---|
| tricer- atops | 6,039 | 15.9 | 7.5 | 48 | 30.8 | 18 | 16.8 | 55.9 (35.0) | 179,704 | 42,190 (26,380) | 4.3X (6.9X) |
| tricer- atops | 6,039 | 15.9 | 7.5 | 30 | 17.8 | 12 | 11.0 | 36.0 (24.4) | 179,704 | 27,159 (18,368) | 6.7X (9.8X) |
| galleon | 5,577 | 12.1 | 7.5 | 30 | 21.9 | 12 | 10.8 | 41.0 (27.2) | 169,064 | 28,536 (18,907) | 6.0X (9.0X) |
| Viper | 58,203 | 23.8 | 7.5 | 36 | 20.1 | 14 | 10.9 | 37.5 (25.0) | 1,698,116 | 272,130 (181,644) | 6.3X (9.4X) |
| 57 Chevy | 31,762 | 12.9 | 7.5 | 33 | 17.3 | 13 | 10.9 | 35.8 (24.3) | 958,160 | 141,830 (96,281) | 6.8X (10.0X) |
| insect | 263,783 | 3.0 | 7.5 | 39 | 22.8 | 15 | 11.0 | 51.5 (33.9) | 9,831,528 | 1,696,283 (1,115,534) | 5.8X (8.9X) |

While certainly statistical variation exists between objects with respect to compression ratios, general trends are nonetheless noted. When compressing using the highest quality setting of the quantization knobs (P48/N18), compression ratios are typically about six. As ratios approach nearly then, most objects begin to show visible quantization artifacts.

It will be appreciated from the foregoing, that a three-dimensional geometry compression algorithm may be implemented in real-time hardware, or in software. Significantly, if three-dimensional rendering hardware contains a geometry decompression unit according to the present invention, application geometry may be stored in memory in compressed format. Further, data transmission may use the compressed format, thus improving effective bandwidth for a graphics accelerator system, including shared virtual reality display environments. The resultant compression can substantially increase the amount of geometry cacheable in main memory.

Figure 7:
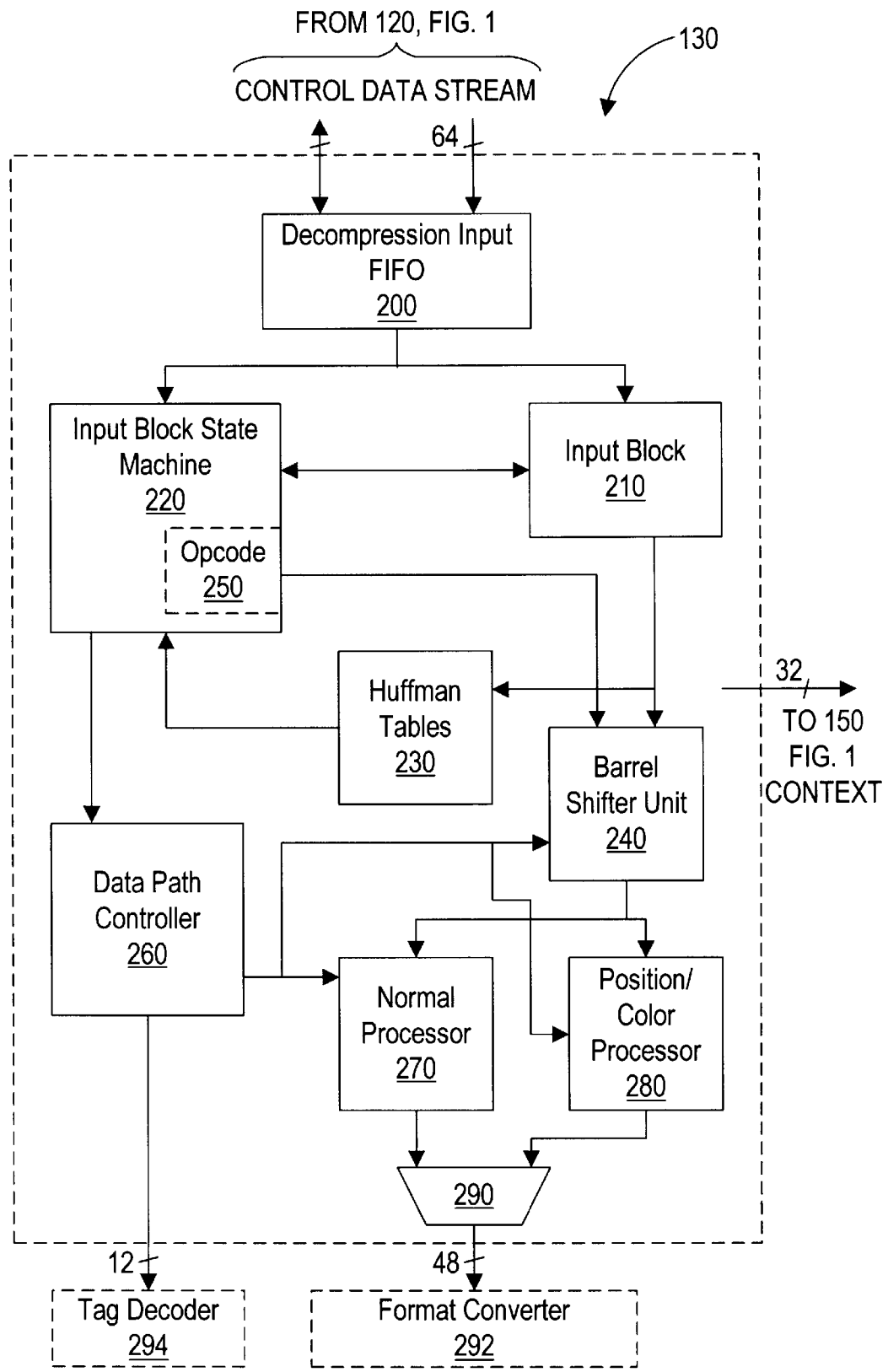
FIG. 7 is a detailed overall block diagram of a decompressor unit, according to the present invention.

FIG. 7 is a detailed block diagram of the decompressor unit 130, shown in FIG. 1. As shown in FIG. 7, unit 130 includes a decompression input first-in-first-out register ("FIFO") 200 whose inputs include control signals and a preferably 32-bit or 64-bit data stream, which signals and data stream preferably come from an accelerator port data FIFO ("APDF") in interface unit 120 (see FIG. 1). The APDD portion of interface 120 includes a controller that signals the size of the incoming data stream to unit 130. FIFO 200 provides output to an input block state machine 220 and to an input block 210, state machine 220 and input block unit 210 communicating with each other.

Output from block 210 is coupled to a barrel shifter unit 240 and to a Huffman table set 230, the output from the Huffman look-up being coupled to state machine 220. Opcode within state machine 220 processes the values provided by the Huffman tables 230 and outputs data to the barrel shifter unit 240. State machine 220 also provides an output to data path controller 260, which outputs a preferably 12-bit wide signal to a tag decoder unit 294 and also outputs data to the barrel shifter unit 240 and to a normal processor 270, and a position/color processor 280.

Barrel shifter unit 240 outputs to the normal processor 270 and to a position/color processor 280. The outputs from processors 270 and 280 are multiplexed by output multiplexer unit 290 into a preferably 48-bit wide signal that is provided to a format converter 292. Decompression unit 130 generates a preferably 12-bit tag that is sent to tag decoder 294 in parallel with either 32-bits or 48-bits (for normals), that are sent to the format converter 292. These data streams provide instructions that generate output to format converter 292. A preferably 32-bit read-back path is used to read-back the state of the unit.

Table 2, below, shows interface signals used to implement decompression unit 130 in the preferred embodiment:

TABLE 2

| Signal Name | Signals | I/O | Description |
| --- | --- | --- | --- |
| id_data | 64 | I | Data inputs from APDF |
| id_tag | 12 | I | Data on inputs is valid from APDF |
| fd_stall | 1 | I | Stall signal from format converter |
| di_busy | 1 | O | Busy signal to status register |
| di_faf | 1 | O | Fifo-almost-full signal-to-input FIFO |
| df_data | 48 | O | Data output to formal converter |
| df_jag | 12 | O | Tag output to tag decoder |
| du_context | 32 | O | Context output to UPA section |

Table 3, below, shows output data formats provided by unit 130 in the preferred embodiment. As described herein, vertex, mesh buffer reference, and passthrough instructions generate transactions from decompression unit 130. Vertex and mesh buffer reference instructions send data to the format converter, and each generates a header indicating vertex replacement policy for the current vertex, followed by component data. Each of these instructions always generates position data and, depending upon the value of the state register, may contain color or normal data. All three of the normal components preferably are sent in parallel, whereas each position and color component is separately sent. A passthrough instruction sends preferably 32-bits of data to the collection buffer.

TABLE 3

| COMPONENTS | FORMAT |
| --- | --- |
| Header | 32. |
| Position | s.15 |
| Color | s.15 |
| Normal | s1.14(x3) |
| Passthrough | 32. |

Figure 8:
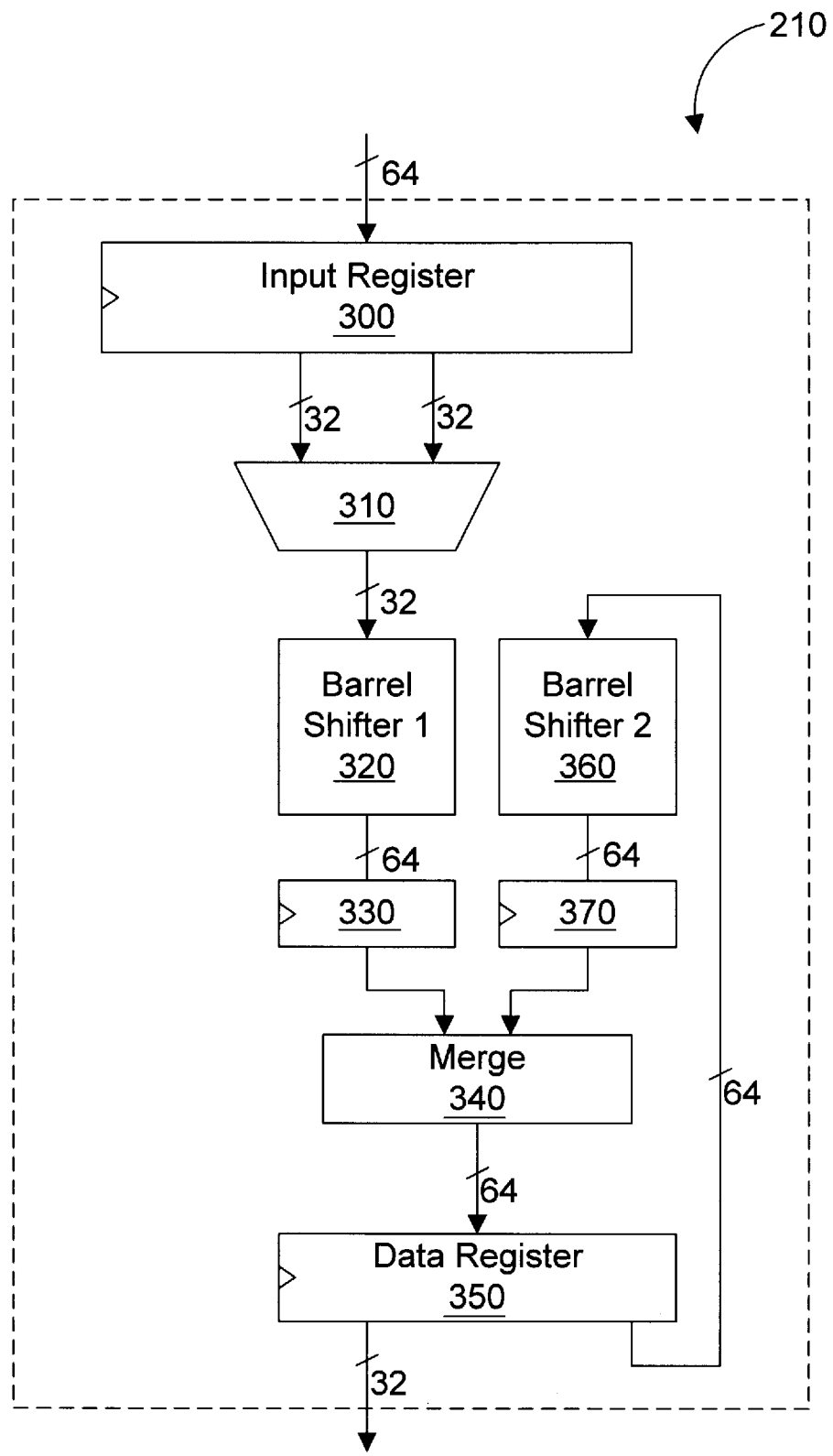
FIG. 8 is a detailed block diagram of the input block shown in FIG. 7.

FIG. 8 is a detailed block diagram of the input block 210 depicted in FIG. 7. A preferably 64-bit input register 300 receives data from the APDF portion of interface 130, with 32-bits or 64-bits at a time being loaded into register 300. Register 300 outputs preferably 32-bits at a time via multiplexer 310 to a first barrel shifter 320 whose output passes through a register 330 into a merge unit 340. The 64-bit output from merge unit 340 is input to data register 350, part of whose output is returned as input to a second barrel shifter 360. The output from second barrel shifter 360 is passed through a register 370 and is also input to merge unit 340. First barrel shifter 320 aligns data to the tail of the bit-aligned data stream being recycled from data register 350 through second barrel shifter 360. The second barrel shifter 360 shifts-off the used bits from data register 350.

Figure 9:
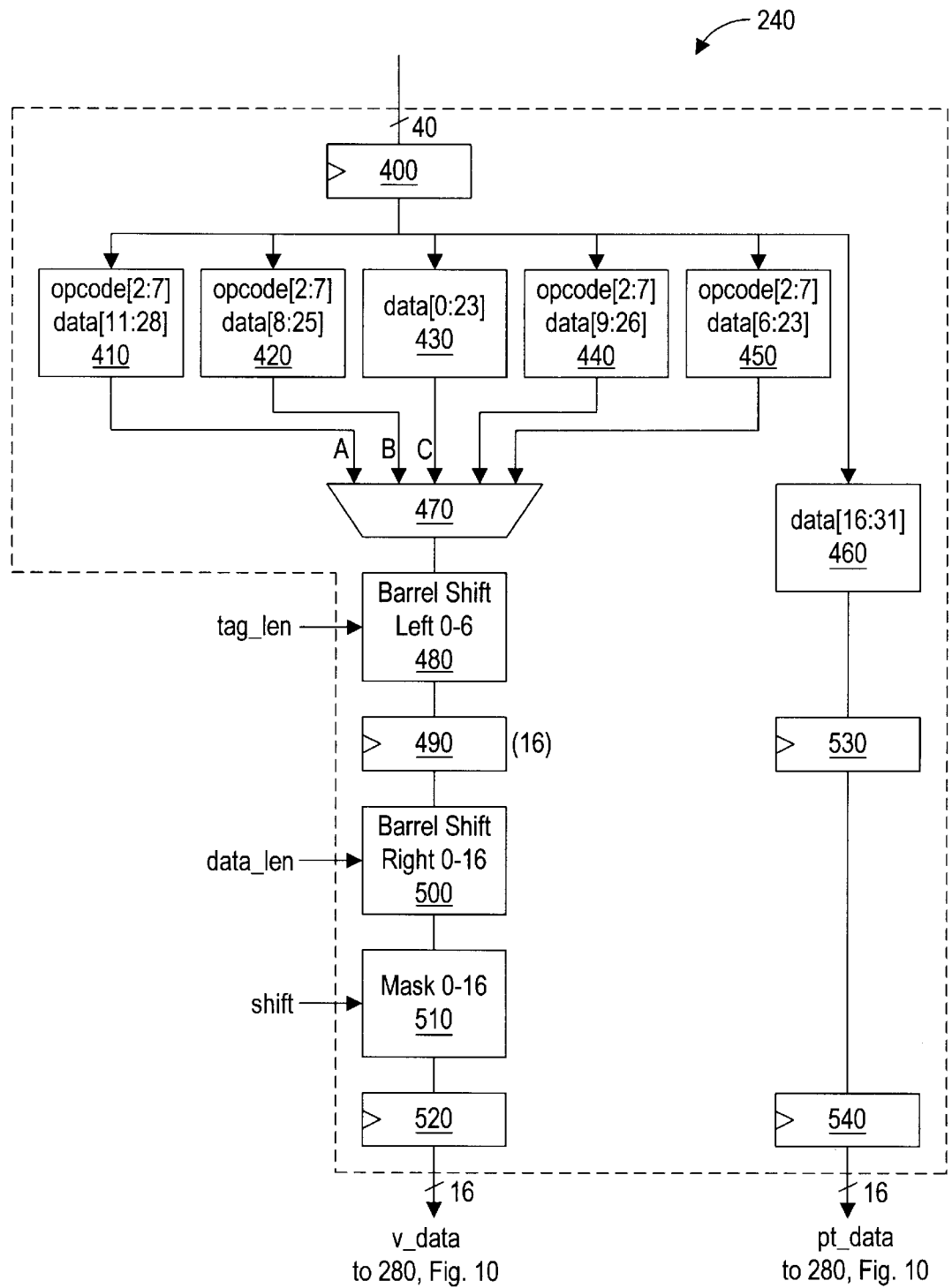
FIG. 9 is a detailed block diagram of the barrel shifter unit shown in FIG. 7.

FIG. 9 is a detailed block diagram of barrel shifter unit 240, shown in FIG. 7. In overview, barrel shifter unit 240 expands the variable-length position, color, and normal index components to their fixed-point precisions. Data into unit 240 from unit 210 and/or 220 is input to a register 400 whose output is shown as defining opcode and/or data units 410, 420, 430, 440, 450, and 460, which are input to a multiplexer unit 470.

Multiplexer unit 470 input A is used for the X component of the vertex instruction, input B is used for the set normal instruction and the first component of the set color instructions, and input C is used for the remaining components of the vertex and set color instructions. Unit 240 further includes a barrel shift left register 480 coupled to receive $tag_{13}$ len data and to output to register 490, whose output in turn is input to a barrel shift right register 500 that is coupled to receive data_len data. Register 500 outputs to a mask unit 510 that is coupled to receive shift dfata and whose output is coupled to register 520, which outputs v_data. The output of data block 460 is coupled to a register 530 whose output is coupled to a second register 540, which outputs pt_data.

An appropriate table within Huffman tables 230 (see FIG. 7) provides values of tag_len, data_len, and shift into units 480, 500 and 510, respectively. Barrel shift left unit 480 shifts the input data left by 0 to 6 bits (tag_len), thus shifting off the Huffman tag.

By contrast, barrel shift right register 500 shifts the data to the right by 0 to 16 bits (16-data_len), and sign extends the data, thus bringing the data to its full size. Mask unit 510 masks off the lower 'shift' bits to clamp the data to the correct quantization level.

Figure 10:
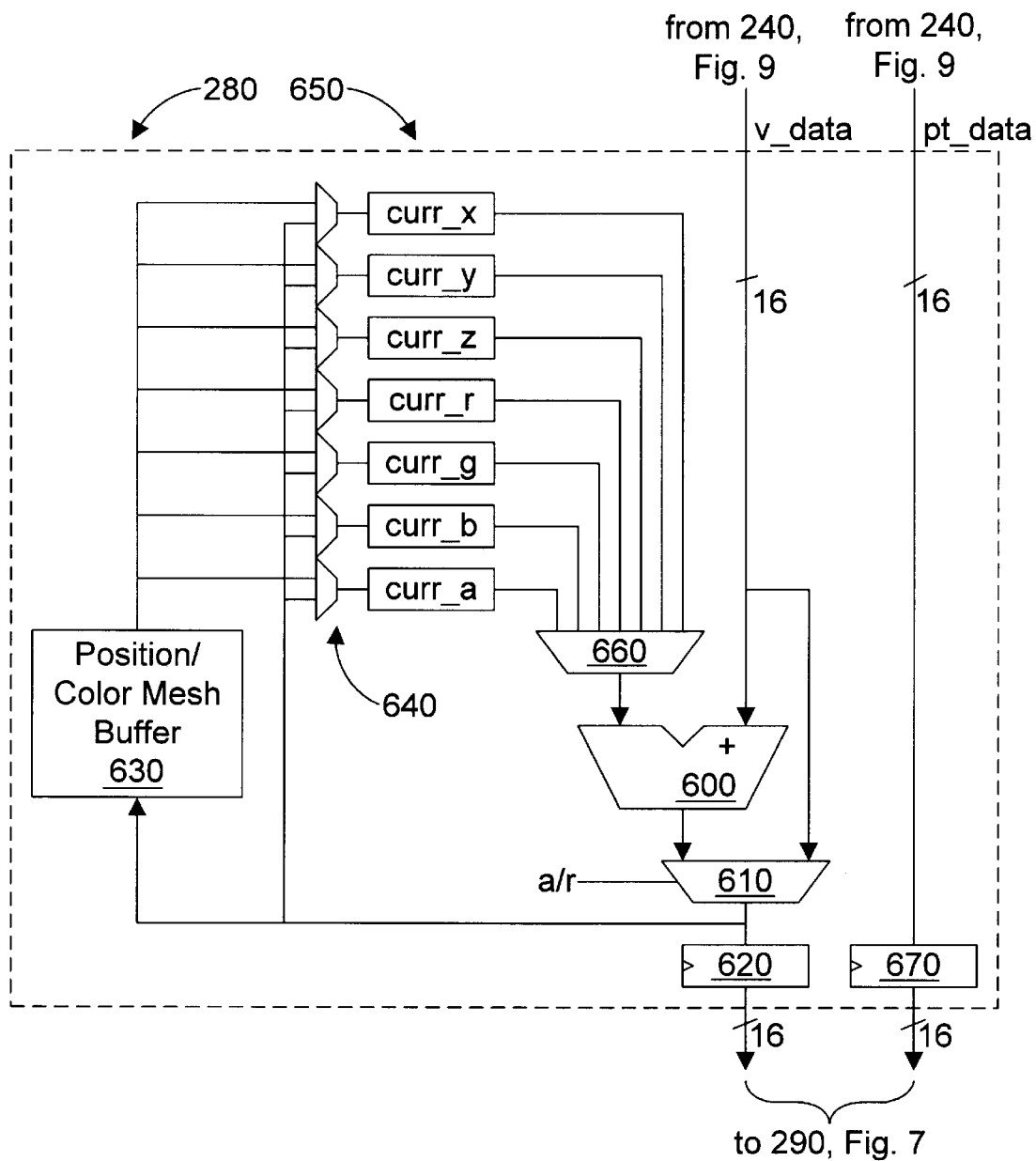
FIG. 10 is a detailed block diagram of the position/color processor unit shown in FIG. 7.

FIG. 10 depicts in greater block diagram detail the position/color processor unit 280, shown in FIG. 7. Processor unit 280 generates final position or color component values. As shown in FIGS. 7 and 9, processor unit 280 receives a preferably 16-bit value (v_data) from the barrel shifter unit 240, specifically mask unit 510 therein.

If the abs_rel bit from the Huffman table 230 is set to relative, the incoming data are added by combiner unit 600 to the appropriate current stored data. The new value passes through multiplexer 610, and is stored back into the register 620, and is sent along to the output multiplexer 290, shown in FIG. 7. However, if the abs_rel bit is set to absolute, the incoming data bypasses adder 600, is latched into the register 620, and is also sent out to the output multiplexer 290.

As shown in FIG. 10, the position/color processor unit 280 further includes a position/color mesh buffer 630 that is coupled to receive the input to register 620. The output from mesh buffer 630 is coupled to multiplexer gates, collectively 640, whose outputs reflect current values of x, y, z, r, g, b and aα. A register set, collectively shown as 650, provides these current values to the input of a multiplexer 660, whose output is coupled to the adder 600. Processor unit 280 further includes a register 670 that receives and outputs pt_data from barrel shifter unit 240.

Figure 11A:
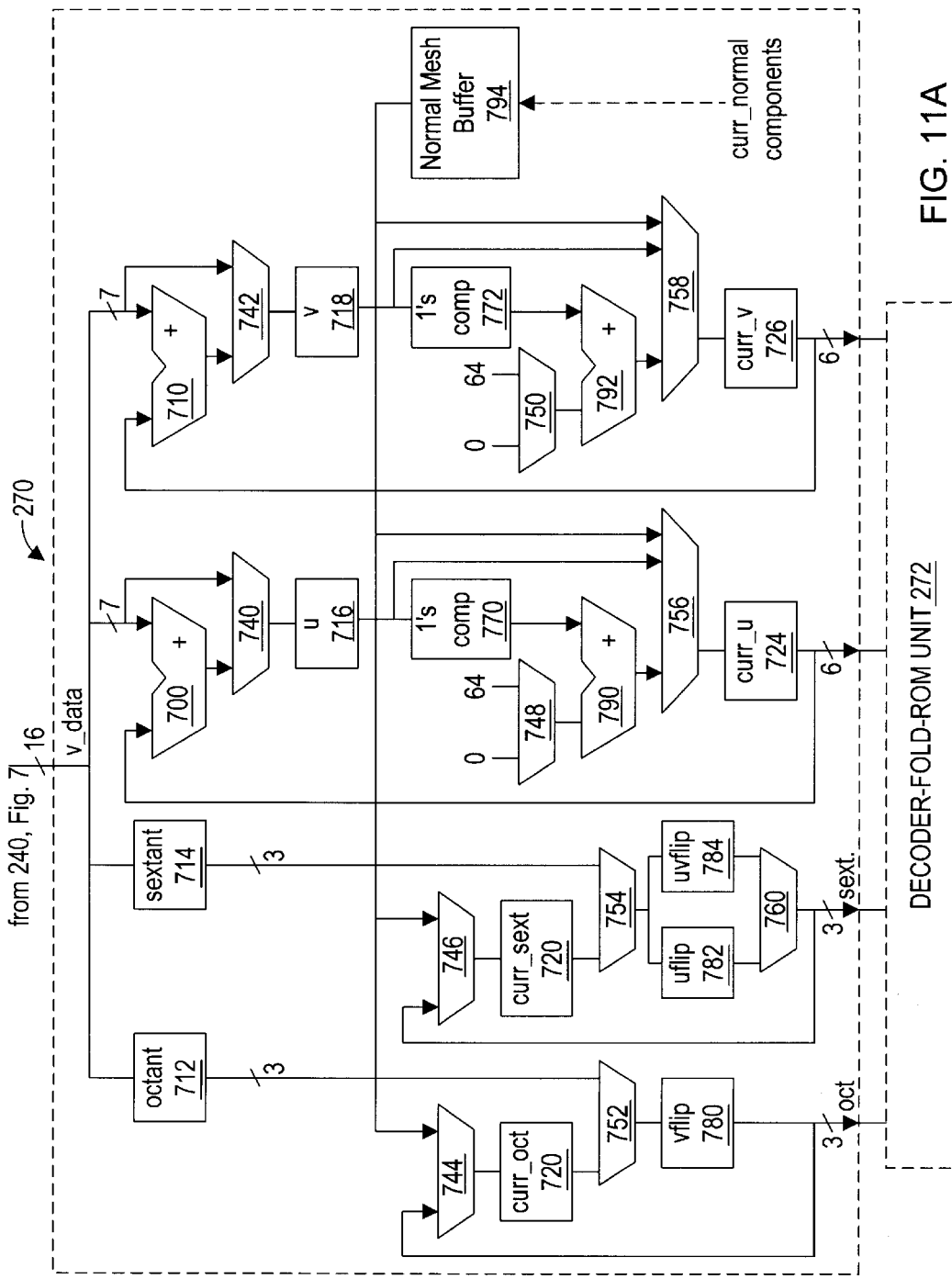
FIG. 11A is a detailed block diagram of the normal processor unit shown in FIG. 7.

As shown in FIG. 7, normal processor unit 270 also outputs data to the output multiplexer 290. FIG. 11A depicts in detail the sub-units comprising normal processor unit 270. As seen in FIG. 7 and FIG. 9, the normal processor unit 270 receives an 18-bit normal index as three separate components: sextant/octant, u and v, or encoded $\Delta u$ and $\Delta v$ components from mask unit 510 in barrel shifter unit 240. If the value is a $\Delta$-value (relative), the $\Delta u$ and $\Delta v$ are added to the current u and v values by respective adders 710. The intermediate values are stored and are also passed on to a fold unit 800 associated with decoder-fold-rom unit 272 (see FIG. 11B).

As shown in FIG. 11A, the normal processor unit 270 further includes registers 712, 714, 716, 718, 720, 722, 724, 726 which hold respective octant, sextant, u and v values, curr oct_curr_sext, curr_u and curr_v values. Also present in unit 270 are multiplexers 740, 742, 744, 746, 748, 750, 752, 754, 756, 758 and 760, l's complementing units 770, 772, latch-flipflop units 780, 782, 784 for holding respective v, u, and uv information, further adders 790, 792, and a normal mesh buffer 794 coupled to receive curr_normal input components.

Figure 11B:
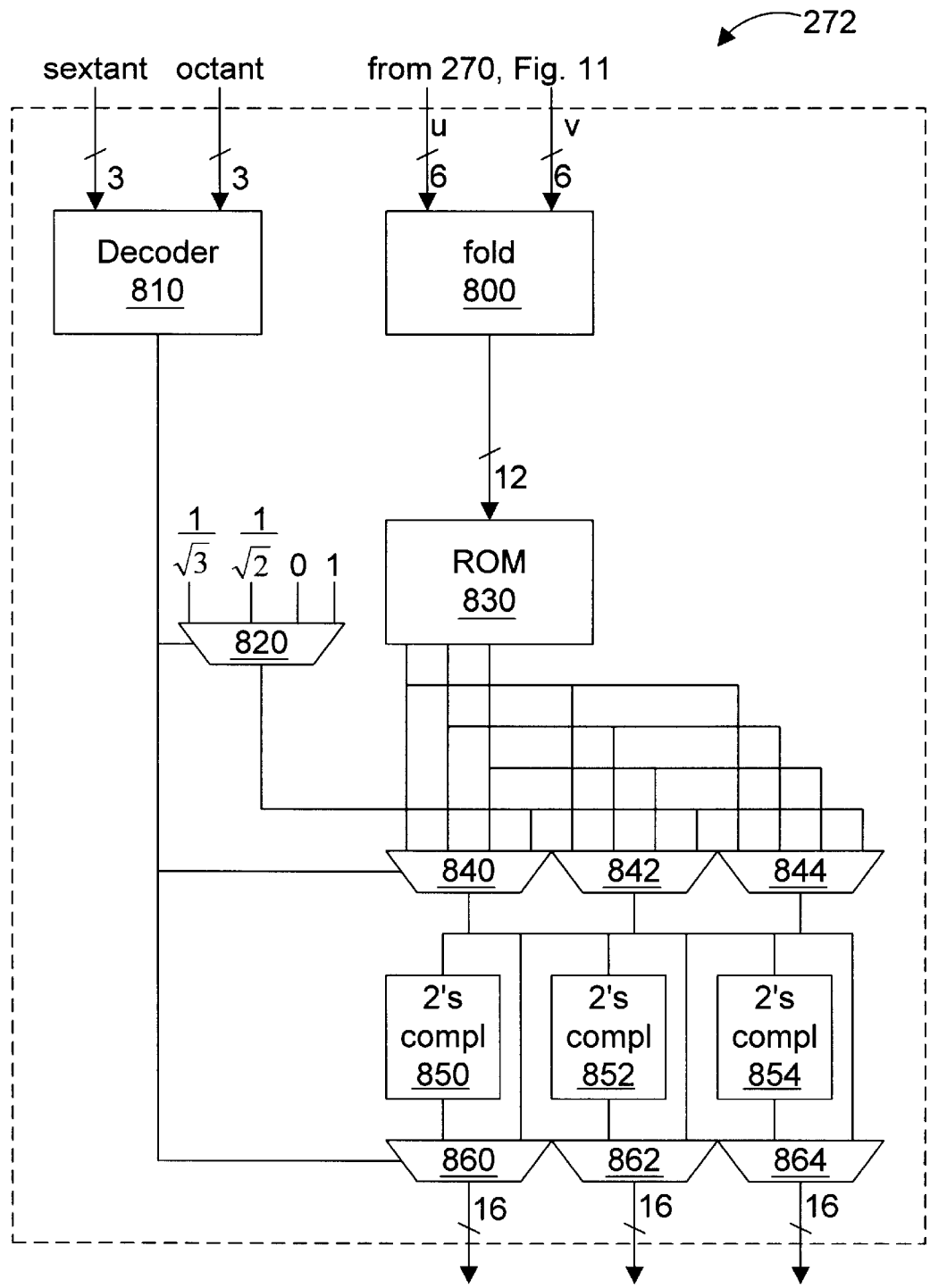
FIG. 11B is a detailed block diagram showing the decoder, fold, and ROM look-up components associated with the normal processor unit of FIG. 11A.

With reference to FIGS. 11A and 11B, for an absolute reference, the u and v values are passed directly to fold unit 800. The octant and sextant portions of the index are sent to decoder 810, within unit 272. Decoder 810 controls multiplexer 820 (which select constants), as well as multiplexers 840, 842, 844, 860, 862, 864, which reorder components, and invert signs (using 2's complement units 850, 852, 854).

Fold unit 800 uses the u and v components of the normal index, from unit 270, to calculate the address into the normal look-up table ROM 830. The octant and sextant fields, from unit 270, drive a decoder 810 that determines sign and ordering of components output from the ROM look-up table 830. Decoder 810 also handles special case normals not included in the normal ROM look-up table 830.

Figure 12:
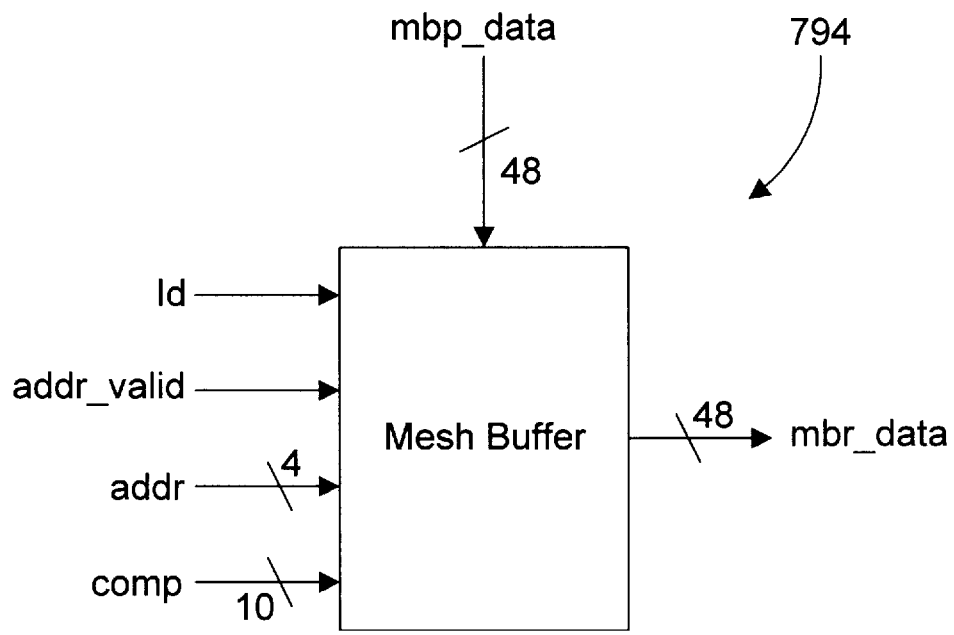
FIG. 12 is a block diagram showing interfaces to a mesh buffer, as shown in FIG. 10 and/or FIG. 11A.

FIG. 12 depicts interfaces to a mesh buffer, as shown in FIG. 10 and/or FIG. 11A. In the preferred embodiment, mesh buffer 794 is implemented as a register file and a pointer to the current location. Data is input to the mesh buffer FIFO at the position of the current location pointer. However, random access to any of the 16 locations is allowed when reading the data out of the FIFO by indexing off this pointer: address=(curr_loc_ptr-index) mod 16.

Figure 13A:
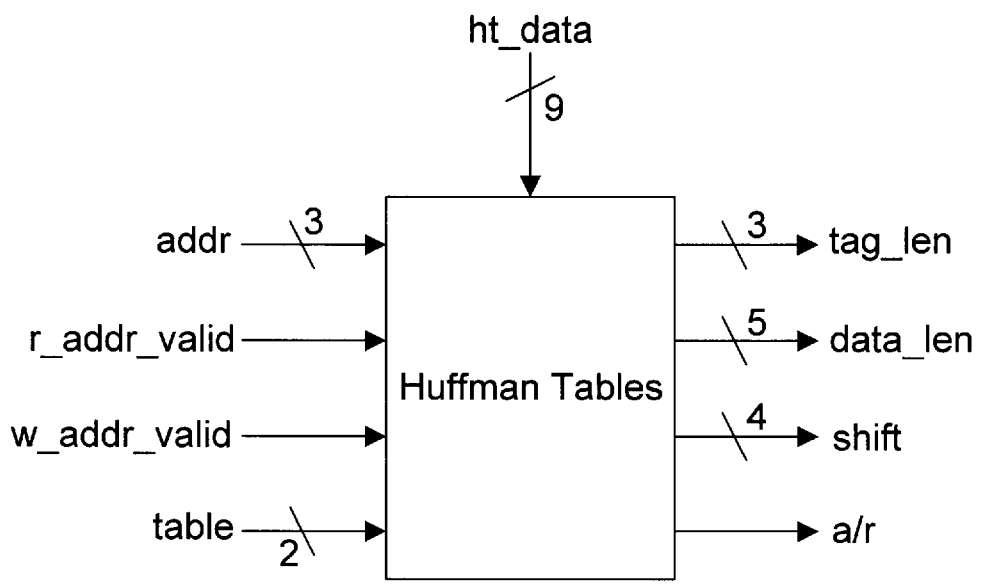
FIG. 13A depicts interfaces to Huffman tables, according to the present invention.

FIG. 13A depicts interfaces to Huffman tables, e.g., tables 230 in FIG. 7. Huffman tables are used to decode the Huffman tags preceding the compressed data. Three Huffman tables are used: one for position, for color, and for normal data, with each table preferably holding 64 entries.

FIG. 13B depicts a preferred format for entry of position and color data in the Huffman tables, while FIG. 13C depicts the preferred format for normal table entries. The instruction format for loading the Huffman tables in the compressed data stream is described later herein.

Several instructions generate data for the format converter 292, shown in FIG. 7, and appropriate tags must be generated for this data so the format converter can correctly process the data. Table 4, below, shows tags generated for the different data components. The components that show two tags may set the launch bit, and the second tag shows the value with the launch bit set.

TABLE 4

| COMPONENTS | TAG |
| --- | --- |
| Header | 0x020 |
| X | 0x011 |
| Y | 0x012 |
| Z | 0x013/0x413 |
| Nx/Ny/Nz | 0x018/0x418 |
| R | 0x014 |
| G | 0x015 |
| B | 0x016/0x416 |
| A | 0x017/0x417 |
| U | 0x0c0/0x4c0 |
| V | 0x01c/0x41c |

Input block state machine 220 (see FIG. 7) includes a preferably six-bit state register that holds information about the processing state of the decompression unit. In the preferred embodiment, the following state bits are defined:

Bit 5: tex—Texture values in place of color

Bit 4: rnt—Replicate normal per vertex

Bit 3: rct—Replicate color per vertex

Bit 2: bnv—Normal bundled with vertex

Bit 1: bcv—Color bundled with vertex

Bit 0: cap—Color includes alpha ($\alpha$)

Position/Color processor unit 280 (see FIGS. 7 and 10) preferably includes three 16-bit registers, curr_x, curr_y, and curr_z, which contain the current position components, X, Y, and Z, and are only updated by vertex instructions.

Normal processor unit 270 (see FIGS. 7 and 11A) preferably includes three six-bit registers, curr_oct, curr_sext, curr_u, curr_v) that contain the current normal. The first register holds the 3-bit sextant and octant fields, and the remaining two registers contain the u and v coordinates for the normal. These values are written using the set normal instruction, or they are updated by the vertex instruction if the bnv bit is set in the state register.

Position/color processor 280 further preferably includes four 16-bit registers, curr_r, curr_g, curr_b, curr_a, which contain the current color components, red, green, blue and alpha ($\alpha$). These components are set using the set color instruction, or they are updated by the vertex instruction if the bcv bit is set in the state register. In the preferred embodiment, alpha is valid only if the cap bit is set in the state register. The test bit is set when processing texture components, in which case only red and green are valid.

The instruction set implementing decompression according to the present invention will now be described. FIG. 14A depicts the vertex instruction format, an instruction that uses variable-length Huffman encoding to represent a vertex. Position information is always present in this instruction.

(REP) The vertex replacement policy is as follows:

00—Restart clockwise

01—Restart counter-clockwise

10—Replace middle

11—Replace oldest (M) mesh buffer push:

0—No push

1—Push

With reference to FIG. 14A, the position data consists of a variable-length Huffman tag (0 to 6 bits) followed by three data fields of equal length for the X, Y, and Z components, which are either $\Delta$-values or absolute values. The data_len field for the entry in the position Huffman table gives the length of each of the X, Y, and Z fields, the tag_len entry gives the length of the tag, and the abs_rel entry tells whether the data is absolute data or is relative to the previous vertex. The shift entry from the Huffman table gives the quantization level (number of trailing zeroes) for the data.

If the bnv bit is set in the state register, a normal is included. The encoded normal has a Huffman tag followed by either two variable-length data fields for Δu and Δv, or a fixed-length field for the sextant and octant (6 bits) followed by two variable-length fields for u and v. The former encoding is for delta encodings of normals, while the latter encoding is for absolute encodings. The data_len, tag_len, abs_rel, and shift fields from the normal Huffman table are used similarly as entries from the position table.

FIG. 14B depicts vertex component data formats. If the bcv bit in the state register is set, color is included with the vertex. The color is encoded similar the position, using three or four fields, but how the fields are used is determined by the tag table. If tagged absolute, then x, y, z, r, g, b data is used. Absolute normals are used with sectant and octant fields. However, if the tag table indicates relative, delta normals are used, and it sufficiences to send latitude and longitude data (e.g., θ and ϕ, also referred to herein as u and v.

With further reference to FIG. 14B, a Huffman tag is followed by three equal length fields for R, G, and B. The cap bit in the state register indicates whether an additional field for α is included. The data_len, tag_len, abs_rel, and shift fields from the color Huffman table are used similarly as for entries from the position and normal tables.

The states of the vertex instruction set are as follows:
1. Latch next opcode; output X; shift barrel shift right unit 500 (see FIG. 10) by ptag_len+pdata_len-pquant+2.
2. Merge; output Header.
3. Output Y; shift barrel shift right unit 500 (see FIG. 9) by pdata_len-pquant.
4. Merge
5. Output Z; shift barrel shift right unit 500 (see FIG. 9) by pdata_len -pquant.
6. Merge.
   a. If (bnv)
      i. if (absolute normal), goto 7,
      ii. else goto 9./*relative normal*/
   b. else If (mt), goto 21,
   c. else If(bcv) goto 13,
   d. else If (rct) goto 22,
   e. else Merge; branch to next instruction.
7. Latch next opcode; output sextant/octant; shift barrel shift right unit 500 (see FIG. 9) by ntag_len+6.
8. Merge.
9. Output U.
   a. If (absolute normal), shift barrel shift right unit 500 (see FIG. 9) by ndata_len-nquant.
   b. else/*relative normal*/, latch next opcode; shift Bs2 by ntag_len+ndata_len-nquant
10. Merge.
11. Output V.
12. Merge.
    a. If (bcv), goto 13,
    b. else If (rct), goto 22,
    C. else Merge; branch to next instruction.
13. Latch next opcode; output R; shift barrel shift right unit 500 (see FIG. 9) by ctag_len+cdata_len-cquant.
14. Merge
15. Output G; shift barrel shift right unit 500 (see FIG. 9) by cdata_len-cquant.
16. Merge; if (tex), branch to next instruction.
17. Output B; shift barrel shift right unit 500 (see FIG. 9) by cdata_len-cquant.
18. Merge; if (˜cap) branch to next instruction.
19. Output A; shift barrel shift right unit 500 (see FIG. 9) by cdata_len-cquant.
20. Merge; branch to next instruction.
21. Output curr_normal.
    a. If (bcv), goto 13,
    b. else If (rct), goto 22,
    c. else Merge; branch to next instruction.
22. Output curr_r.
23. Output curr_g. If (tex), Merge; branch to next instruction
24. Output curr_b. If (˜cap), Merge; branch to next instruction.
25. Output curr_a. Merge branch to next instruction.

FIG. 14C depicts the formnat for the set normal instruction. The set normal instruction sets the value of the current normal registers. The normal data is encoded similarly as is normal data in the vertex instruction, described herein. The states of the set normal instruction are as follows:

If (absolute normal)
1. Latch next opcode; output sextant/octant; shift barrel shift right unit 500 (see FIG. 9) by ntag_len+8.
2. Merge.
3. Output U; shift barrel shift right unit 500 (see FIG. 9) by ndata_len-nquant.
4. Merge.
5. Output V; shift barrel shift right unit 500 (see FIG. 9) by ndata_len+nquant.
6. Merge; branch to next instruction.
else/*relative normal*/
1. Latch next opcode; output dU; shift barrel shift right unit 500 (see FIG. 9) by n_tag_len+ndata_len-nquant.
2. Merge.
3. Output dV; shift barrel shift right unit 500 (see FIG. 9) by ndata_len-nquant.
4. Merge; branch to next instruction.

Figure 14D:
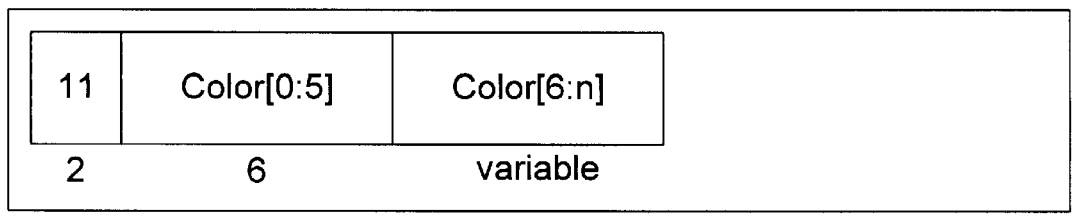
FIG. 14D depicts a set color instruction, according to the present invention.

FIG. 14D depicts the set color instruction, an instruction that sets the value of the current color registers. Encoding of the color data is similar to encoding of the color data in the vertex instruction. The states of the set color instruction are as follows:
1. Latch next opcode; output R; shift barrel shift right unit 500 (see FIG. 9) by ctag_len+cdata_len-cquant+2.
2. Merge.
3. Output G; shift barrel shift right unit 500 (see FIG. 9) by cdata_len-cquant.
4. Merge. If (tex), branch to next instruction.
5. Output B; shift barrel shift right unit 500 (see FIG. 9) by cdata_len-cquant.
6. Merge. If (˜cap) branch to next instruction.
7. Output A; shift barrel shift right unit 500 (see FIG. 9) by cdata_len-cquant.
8. Merge; branch to next instruction.

Figure 14E:
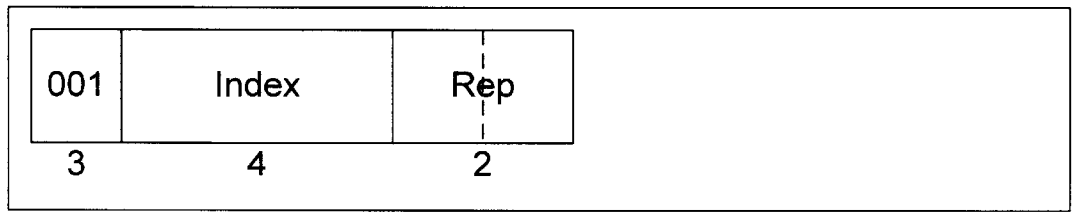
FIG. 14E depicts a mesh buffer reference instruction, according to the present invention.

FIG. 14E is the preferred format for the mesh buffer reference instruction. This instruction causes data from an entry in the mesh buffer to be sent out to the format converter as the next vertex. With reference to FIG. 14E, the index indicates the entry from the mesh buffer to send. The newest entry in the mesh buffer has index 0, and the oldest has index 15. REP, the above-described replacement policy for the vertex instruction, is the same as used for the mesh buffer reference instruction. The states for the mesh buffer reference instruction are as follows:

1. Latch next opcode; output Header; shift barrel shift right unit 500 (see FIG. 9) by 9.
2. Output X from mesh buffer.
3. Output Y from mesh buffer.
4. Output Z from mesh buffer.
   a. If (bnv or rt) goto 5,
   b. else If (bcv or rct) goto 6,
   c. else Merge; branch to next instruction.
5. If (bnv), output Normal from mesh buffer, else if (rnt) output curr_normal.
   a. If (bnv or rct) goto 6,
   b. else Merge; branch to next instruction.
6. If (bcv), output R from mesh buffer, else if (rct) output curr_r.
7. If (bcv), output G from mesh buffer, else if (rct) output curr_g. If (tex), Merge; branch to next instruction.
8. If (bcv), output B from mesh buffer, else if (rct) output curr_b. If (~cap), Merge; branch to next instruction.
9. If (bcv), output A from mesh buffer, else if (rct) output curr_a. Merge; branch to next instruction.

Figure 14F:
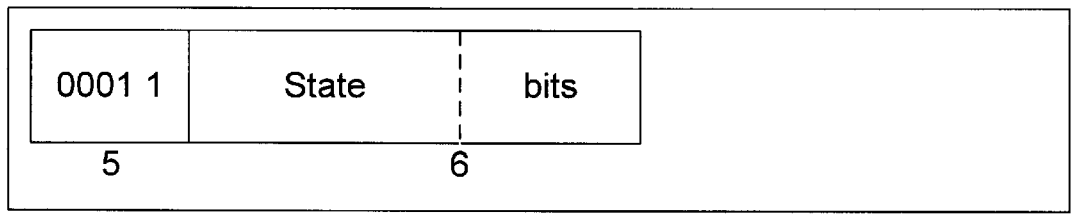
FIG. 14F depicts a set state instruction, according to the present invention.

FIG. 14F depicts the set state instruction, which sets the bits the decompression unit state register. The states for the set state instruction are as follows:
1. Latch next opcode; shift barrel shifter 2 by 11 bits.
2. Merge; branch instruction
3.

Figure 14G:
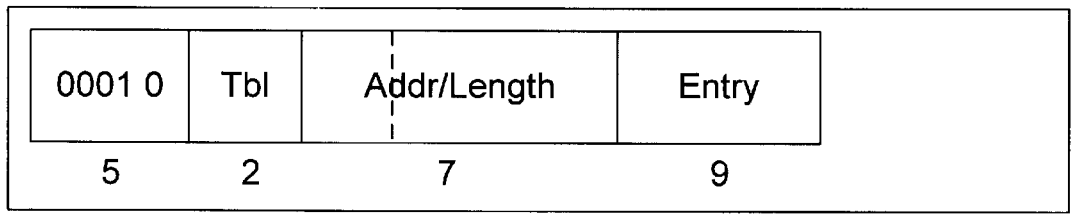
FIG. 14G depicts a set table instruction, according to the present invention.

FIG. 14G depicts the set table instruction, which sets Huffman table entries. The table selection is as follows:
00—Position table
01—Colortable
10—Normal table
11—Undefined The tag length is derived from the address. The nine bits in the entry field correspond to the absolute/relative bit, data length, and shift amount fields of the Huffman table entries. (The preferred format of the Huffman table entries has been described earlier herein.) The states of the set table instruction are as follows:
1. Latch next opcode; send address and entry to Huffman tables; shift barrel shift right unit 500 (see FIG. 9) by 23.
2. Merge; branch to next instruction.

Table 5 shows the preferred Huffman Table Fill Codes.

TABLE 5

| Address | Entries Filled | Tag Length | Fill Range |
|---|---|---|---|
| 0tttttt | 1 | 6 | tttttt |
| 10ttttt | 2 | 5 | ttttt0-ttttt1 |
| 110tttt | 4 | 4 | tttt00-tttt11 |
| 1110ttt | 8 | 3 | ttt000-ttt111 |
| 11110tt | 16 | 2 | tt0000-tt1111 |
| 111110t | 32 | 1 | t00000-t11111 |
| 1111110 | 64 | 0 | Entire table |

Figure 14H:
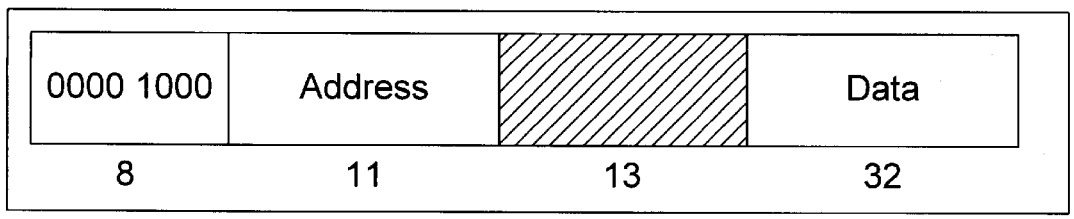
FIG. 14H depicts a passthrough instruction, according to the present invention.

FIG. 14H depicts the passthrough instruction, which allows passthrough data to be encoded in the compressed-data stream. The length of the instruction preferably is 64-bits. Aligning successive passthrough instructions to a 64-bit boundary allows for patching of passthrough data in the encoded stream. The states for the passthrough instruction are as follows:
1. Latch next opcode; read address, shift barrel shift right unit 500 (see FIG. 9) by 32 bits.
2. Merge.
3. Output data, shift barrel shift right unit 500 (see FIG. 9) by 32 bits.
4. Merge; branch to next instruction.

Figure 14I:
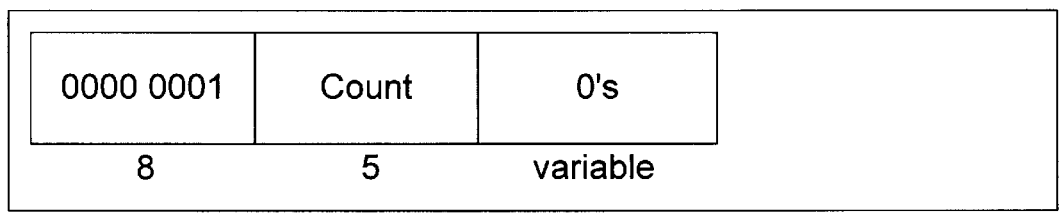
FIG. 14I depicts a variable-length NOP instruction, according to the present invention.

FIG. 14I depicts the variable-length NOP ("VNOP) instruction, which encodes a variable number of 0 bits in the data stream. The five-bit count shown in FIG. 14I designates the number of 0 bits that follow. This instruction is implicitly used for the start of the data stream. This instruction may also be used to pad the data stream to 32-bit or 64-bit boundaries, or encoding regions, for later patching. The states for this instruction are:
1. Latch next opcode; read count; barrel shift right unit 500 (see FIG. 9) by 13 bits;
2. Merge.
3. Barrel shift right unit reads "count" positions;
4. Merge; branch to next instruction.

Figure 14J:
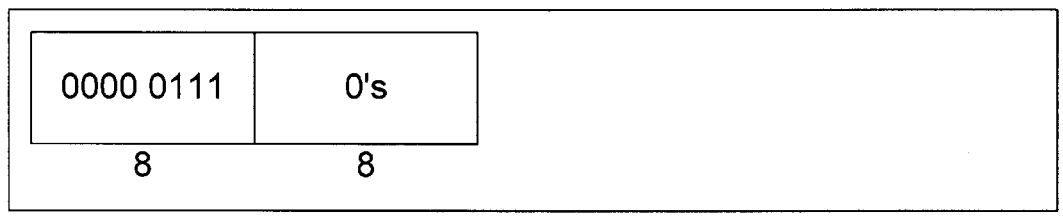
FIG. 14J depicts a skip 8 instruction, according to the present invention.

FIG. 14J shows the skip 8 instruction, whose states are:
1. Latch next opcode; shift barrel shift right unit 500 (see FIG. 9) by 16 bits;
2. Merge; branch to next instruction.

It will be appreciated that it may be advantageous to reduce bandwidth requirements between devices by not decompressing a data stream at a single point in a decompression system. The present invention can provide parallel decompression of a data stream by providing an additional command advising the arrival of a given number of data words that may be processed in parallel.

The present invention can recognize the presence of such parallel opportunities by the presence of mark bits, and cause the stated number of data words to be shuttled to other processors within the system, for parallel decompression. Further, it is then permissible to jump ahead the given number of words in the data stream to arrive at the next data that is not eligible for parallel processing.

The present invention can also provide morphing capability to eliminate any abrupt perception gap in viewing a decompressed three-dimensional object. Within the decompressed data stream, it is possible to specify vertices as linear or other interpolations of vertices that are actually present or have previously been decompressed. Assume, for example, that the three-dimensional object is a tiger. At a far distance, no teeth are present in the tiger's mouth, yet at near distance teeth are present. The present invention can provide a seamless transition such that as distance to the tiger shrinks, the teeth grow, with no sudden change seen between a toothless tiger and a toothed tiger.

Modifications and variations may be made to the disclosed embodiments without departing from the subject and spirit of the invention as defined by the following claims.

What is claimed is:

1. A method for decompressing compressed 3-D geometry data which includes a compressed representation of a first normal corresponding to a first vertex, comprising:
receiving said compressed representation of said first normal, wherein said compressed representation includes information identifying a location of a first point on a predetermined sphere located in a first coordinate space;
forming a decompressed representation of said first normal utilizing said information identifying said location of said first point.

2. A method for decompressing compressed 3-D geometry data which includes a compressed representation of a first normal corresponding to a first vertex, comprising:
receiving said compressed representation of said first normal, wherein said compressed representation includes at least an index value;
receiving one or more mapping values usable to decompress said first normal;

selecting a first set of coordinate values using said index value, wherein said first set of coordinate values correspond to a first set of coordinate axes, wherein said first set of coordinate axes define a first coordinate space which includes a predetermined sphere, wherein said first set of coordinate values identify a first point located in a predetermined region of a surface of said predetermined sphere;

mapping said first set of coordinate values to a second set of coordinate values using said one or more mapping values, wherein said second set of coordinate values correspond to said first set of coordinate axes, and wherein said second set of coordinate values specify a second point on said surface of said predetermined sphere;

and wherein said second set of coordinate values are usable to form a decompressed representation of said first normal.

3. The method of claim 2, wherein said compressed 3-D geometry data includes information describing a plurality of three-dimensional vertices, wherein said plurality of three-dimensional vertices are usable to form a plurality of geometric primitives in order to represent a surface of a three-dimensional graphical object.

4. The method of claim 2, wherein said selecting a first set of coordinate values includes using said index value to select said first set of coordinate values from a plurality of predetermined sets of coordinate values, wherein each of said plurality of predetermined sets of coordinate values correspond to one of a plurality of predetermined points within said predetermined region of said predetermined sphere.

5. The method of claim 4, wherein said index value includes a first index component and a second index component, wherein said first set of coordinate values are selected using both said first index component and said second index component.

6. A method for decompressing compressed 3-D geometry data which includes a compressed representation of a first normal corresponding to a first vertex, comprising:

receiving said compressed representation of said first normal, wherein said compressed representation includes at least an index value;

receiving one or more mapping values usable to decompress said first normal;

selecting a first set of coordinate values using said index value, wherein said first set of coordinate values correspond to a first set of coordinate axes, wherein said first set of coordinate axes define a first coordinate space which includes a predetermined sphere, wherein said first set of coordinate values identify a first point located in a predetermined region of a surface of said predetermined sphere, wherein said selecting a first set of coordinate values includes using said index value to select said first set of coordinate values from a plurality of predetermined sets of coordinate values, wherein each of said plurality of predetermined sets of coordinate values correspond to one of a plurality of predetermined points within said predetermined region of said predetermined sphere, wherein said index value includes a first index component and a second index component, wherein said first set of coordinate values are selected using both said first index component and said second index component, wherein said first index component and said second index component are usable to locate points on a two-dimensional coordinate grid;

mapping said first set of coordinate values to a second set of coordinate values using said one or more mapping values, wherein said second set of coordinate values correspond to said first set of coordinate axes, and wherein said second set of coordinate values specify a second point on said surface of said predetermined sphere;

and wherein said second set of coordinate values are usable to form a decompressed representation of said first normal.

7. The method of claim 6, wherein said first index component and said second index component are usable to locate points within said predetermined region of said surface of said predetermined sphere.

8. The method of claim 7, wherein said first coordinate space is an xyz coordinate space, and wherein said first set of coordinate axes include an x axis, a y axis, and a z axis.

9. The method of claim 8, wherein said predetermined sphere is centered on an origin of said first set of coordinate axes.

10. The method of claim 9, wherein said first index component is a value of an angle $\theta$, wherein said angle $\theta$ is measured about said y axis to said first point, and wherein said second index component is a value of an angle $\theta$, wherein said angle $\theta$ is measured latitudinally from the plane at y=0 to said first point.

11. The method of claim 7, wherein said predetermined sphere is centered on an origin of said first set of coordinate axes.

12. The method of claim 11, wherein said predetermined sphere is a unit sphere.

13. The method of claim 11, wherein said receiving said compressed representation of said first normal includes:

receiving a header portion which includes a first tag value;

determining a length value of a body portion using said first tag value;

receiving said body portion using said length value determined from said first tag value;

wherein said header portion and said body portion collectively include said compressed representation of said first normal.

14. The method of claim 13, further comprising using information in said header portion to determine a first normalization coefficient for said first normal, wherein said first normalization coefficient is usable for scaling said first index component and said second index component to predetermined numeric ranges.

15. The method of claim 14, wherein said first normalization coefficient includes a first coefficient component and a second coefficient component.

16. The method of claim 15, further comprising using information in said header value to determine a first absolute/relative value for said first normal, wherein said first absolute/relative value indicates if said first normal is absolutely specified or delta-encoded.

17. The method of claim 16, wherein said first absolute/relative value indicates that said first normal is absolutely specified.

18. The method of claim 17, wherein said one or mapping values are included in said compressed representation of said first normal.

19. The method of claim 18, further comprising scaling said first index component in accordance with said first coefficient component, thereby producing a first scaled index component, and further comprising scaling said second index component in accordance with said second coefficient component, thereby producing a second scaled index component.

20. The method of claim 19, wherein said first scaled index component and said second scaled index component are usable to select said first set of coordinate values from said plurality of predetermined sets of coordinate values.

21. The method of claim 16, wherein said first absolute/relative value indicates that said first normal is delta-encoded relative to a previously specified normal.

22. The method of claim 21, wherein said previously specified normal corresponds to a third point on said surface of said predetermined sphere, wherein said third point is identified by a third set of coordinate values, and wherein said third point is related to a fourth point within said predetermined region of said surface of said predetermined sphere by a first mapping, and wherein said fourth point corresponds to a fourth set of coordinate values previously selected by a previous index value.

23. The method of claim 22, wherein said selecting said first set of coordinate values includes adding said index value to said previous index value in order to produce a final index value, wherein said final index value is usable to select said first set of coordinate values.

24. The method of claim 23, wherein said previous index value includes a previous first index component and a previous second index component, and wherein said final index value includes a final first index component and a final second index component.

25. The method of claim 24, wherein said adding said index value to said previous index value includes adding said first index component to said previous first index component, thereby generating said final first index component, and wherein said adding said index value to said previous index value further includes adding said second index component to said previous second index component, thereby generating said final second index value.

26. The method of claim 25, wherein said mapping said first set of coordinate values to said second set of coordinate values includes generating said second set of coordinate values from said first set of coordinate values using said first mapping.

27. The method of claim 26, further comprising scaling said first index component in accordance with said first coefficient component, thereby producing a first scaled index component, and further comprising scaling said second index component in accordance with said second coefficient component, thereby producing a second scaled index component.

28. The method of claim 27, wherein said adding said index value to said previous index value includes adding said first scaled index component to said previous first index component to produce said final first index component, and wherein said adding said index value to said previous index value further includes adding said second scaled index component to said previous second index component to produce said final second index component.

29. The method of claim 28, wherein said final first index component and said final second index component are usable to select said first set of coordinate values from said plurality of predetermined sets of coordinate values.

30. A method for decompressing compressed 3-D geometry data which includes a compressed representation of a first normal corresponding to a first vertex, comprising:

receiving said compressed representation of said first normal, wherein said compressed representation includes at least an index value;

receiving one or more mapping values usable to decompress said first normal;

selecting a first set of coordinate values using said index value, wherein said first set of coordinate values correspond to a first set of coordinate axes, wherein said first set of coordinate axes define a first coordinate space which includes a predetermined sphere centered on an origin of said first set of coordinate axes, wherein said first set of coordinate values identify a first point located in a first surface portion of said predetermined sphere, wherein said first surface portion corresponds to a predetermined octant of said predetermined sphere;

mapping said first set of coordinate values to a second set of coordinate values using said one or more mapping values, wherein said second set of coordinate values correspond to said first set of coordinate axes, and wherein said second set of coordinate values specify a second point on said surface of said predetermined sphere;

and wherein said second set of coordinate values are usable to form a decompressed representation of said first normal.

31. The method of claim 30, wherein said index value includes a first index component and a second index component, wherein said first set of coordinate values are selected using both said first index component and said second index component.

32. The method of claim 31, wherein said first index component and said second index component are usable to locate points on a two-dimensional coordinate grid.

33. The method of claim 32, wherein said first index component and said second index component are usable to locate points on said predetermined sphere which are within said first surface portion.

34. The method of claim 33, wherein said first coordinate space is an xyz coordinate space, and wherein said first set of coordinate axes include an x axis, a y axis, and a z axis.

35. The method of claim 34, wherein said first index component is a value of an angle $\theta$, wherein said angle $\theta$ is measured about said y axis to said first point, and wherein said second index component is a value of an angle $\phi$, wherein said angle $\phi$ is measured latitudinally from the plane at y=0 to said first point.

36. The method of claim 33, wherein said receiving said compressed representation of said first normal includes:

receiving a header portion which includes a first tag value;

determining a length value of a body portion using said first tag value;

receiving said body portion using said length value determined from said first tag value;

wherein said header portion and said body portion collectively include said compressed representation of said first normal.

37. The method of claim 36, further comprising using information in said header portion to determine a first normalization coefficient for said first normal, wherein said first normalization coefficient is usable for scaling said first index component and said second index component to predetermined numeric ranges.

38. The method of claim 37, wherein said first normalization coefficient includes a first coefficient component and a second coefficient component.

39. The method of claim 38, further comprising using information in said header value to determine a first absolute/relative value for said first normal, wherein said first absolute/relative value indicates if said first normal is absolutely specified or delta-encoded.

40. The method of claim 39, wherein said first absolute/relative value indicates that said first normal is absolutely specified.

41. The method of claim 40, wherein said one or mapping values are included in said compressed representation of said first normal.

42. The method of claim 41, wherein said one or more mapping values include an octant value which specifies a particular octant in which said second point is located.

43. The method of claim 42, wherein said selecting a first set of coordinate values includes using said index value to select said first set of coordinate values from a plurality of predetermined sets of coordinate values, wherein each of said plurality of predetermined sets of coordinate values correspond to one of a plurality of predetermined points within said first surface portion of said predetermined sphere.

44. The method of claim 42, wherein said mapping said first set of coordinate values to said second set of coordinate values includes:
generating magnitudes of said second set of coordinate values by using magnitudes of said first set of coordinate values;
setting one or more sign bits of said second set of coordinate values by using sign bits of points located within said particular octant specified by said octant value.

45. The method of claim 44, further comprising scaling said first index component in accordance with said first coefficient component, thereby producing a first scaled index component, and further comprising scaling said second index component in accordance with said second coefficient component, thereby producing a second scaled index component.

46. The method of claim 45, wherein said first scaled index component and said second scaled index component are usable to select said first set of coordinate values from said plurality of predetermined sets of coordinate values.

47. The method of claim 39, wherein said first absolute/relative value indicates that said first normal is delta-encoded relative to a previously specified normal.

48. The method of claim 47, wherein said previously specified normal corresponds to a third point on said surface of said predetermined sphere, wherein said third point is identified by a third set of coordinate values, and wherein said third point is related to a fourth point within said first surface portion of said predetermined sphere by a first mapping, and wherein said fourth point corresponds to a fourth set of coordinate values previously selected by a previous index value.

49. The method of claim 48, wherein said one or more mapping values are included in a compressed representation of said previously specified normal.

50. The method of claim 49, wherein said one or more mapping values include a previous octant value which specifies a particular octant in which said third point is located.

51. The method of claim 50, wherein said second point is also located in said particular octant.

52. The method of claim 50, wherein said selecting said first set of coordinate values includes adding said index value to said previous index value in order to produce a final index value, wherein said final index value is usable to select said first set of coordinate values from a plurality of predetermined sets of coordinate values, wherein each of said plurality of predetermined sets of coordinate values correspond to one of a plurality of predetermined points within said first surface portion of said predetermined sphere.

53. The method of claim 52, wherein said previous index value includes a previous first index component and a previous second index component, and wherein said final index value includes a final first index component and a final second index component.

54. The method of claim 53, wherein said adding said index value to said previous index value includes adding said first index component to said previous first index component, thereby generating said final first index component, and wherein said adding said index value to said previous index value further includes adding said second index component to said previous second index component, thereby generating said final second index value.

55. The method of claim 52, wherein said mapping said first set of coordinate values to said second set of coordinate values includes:

generating magnitudes of said second set of coordinate values by using magnitudes of said first set of coordinate values;
setting one or more sign bits of said second set of coordinate values by using sign bits of said third set of coordinate values.

56. The method of claim 55, further comprising scaling said first index component in accordance with said first coefficient component, thereby producing a first scaled index component, and further comprising scaling said second index component in accordance with said second coefficient component, thereby producing a second scaled index component.

57. The method of claim 56, wherein said adding said index value to said previous index value includes adding said first scaled index component to said previous first index component to produce said final first index component, and wherein said adding said index value to said previous index value further includes adding said second scaled index component to said previous second index component to produce said final second index component.

58. The method of claim 57, wherein said final first index component and said final second index component are usable to select said first set of coordinate values from said plurality of predetermined sets of coordinate values.

59. A method for decompressing compressed 3-D geometry data which includes a compressed representation of a first normal corresponding to a first vertex, comprising:
receiving said compressed representation of said first normal, wherein said compressed representation includes at least an index value;
receiving one or more mapping values usable to decompress said first normal;
selecting a first set of coordinate values using said index value, wherein said first set of coordinate values correspond to a first set of coordinate axes, wherein said first set of coordinate axes define a first coordinate space which includes a predetermined sphere centered on an origin of said first set of coordinate axes, wherein said first set of coordinate values identify a first point located in a first surface portion of said predetermined sphere, wherein said first surface portion corresponds to a predetermined sub-octant region of a second surface portion, wherein said second surface portion corresponds to a predetermined octant of said predetermined sphere;
mapping said first set of coordinate values to a second set of coordinate values using said one or more mapping values, wherein said second set of coordinate values correspond to said first set of coordinate axes, and wherein said second set of coordinate values specify a second point on said surface of said predetermined sphere;
and wherein said second set of coordinate values are usable to form a decompressed representation of said first normal.

60. The method of claim 59, wherein said index value includes a first index component and a second index component, wherein said first set of coordinate values are selected using both said first index component and said second index component.

61. The method of claim 60, wherein said first index component and said second index component are usable to locate points on a two-dimensional coordinate grid.

62. The method of claim 61, wherein said first index component and said second index component are usable to locate points on said predetermined sphere which are within said first surface portion.

63. The method of claim 62, wherein said first coordinate space is an xyz coordinate space, and wherein said first set of coordinate axes include an x axis, a y axis, and a z axis.

64. The method of claim 63, wherein said first index component is a value of an angle θ, wherein said angle θ is measured about said y axis to said first point on said predetermined sphere, and wherein said second index component is a value of an angle φ, wherein said angle φ is measured latitudinally from the plane at y=0 to said first point on said predetermined sphere.

65. The method of claim 62, wherein said receiving said compressed representation of said first normal includes:
receiving a header portion which includes a first tag value;
determining a length value of a body portion using said first tag value;
receiving said body portion using said length value determined from said first tag value;
wherein said header portion and said body portion collectively include said compressed representation of said first normal.

66. The method of claim 65, further comprising using information in said header portion to determine a first normalization coefficient for said first normal, wherein said first normalization coefficient is usable for scaling said first index component and said second index component of said first normal to predetermined numeric ranges.

67. The method of claim 66, wherein said first normalization coefficient includes a first coefficient component and a second coefficient component.

68. The method of claim 67, further comprising using information in said header value to determine a first absolute/relative value for said first normal, wherein said first absolute/relative value indicates if said first normal is absolutely specified or delta-encoded.

69. The method of claim 68, wherein said first absolute/relative value indicates that said first normal is absolutely specified.

70. The method of claim 69, wherein said one or more mapping values are included in said compressed representation of said first normal.

71. The method of claim 70, wherein said one or more mapping values include an octant value and a sub-octant value, wherein said octant value specifies a particular octant of said predetermined sphere in which said second point is located, and wherein said sub-octant value specifies a particular sub-octant region within said second surface portion.

72. The method of claim 71, wherein said selecting a first set of coordinate values includes using said index value to select said first set of coordinate values from a plurality of predetermined sets of coordinate values, wherein each of said plurality of predetermined sets of coordinate values correspond to one of a plurality of predetermined points within said first surface portion of said predetermined sphere.

73. The method of claim 72, wherein said mapping said first set of coordinate values to said second set of coordinate values includes:
generating an intermediate set of coordinate values from said first set of coordinate values, wherein said intermediate set of coordinate values correspond to an intermediate point located within said particular sub-octant region of said second surface portion;
generating magnitudes of said second set of coordinate values by using magnitudes of said intermediate set of coordinate values;
setting one or more sign bits of said second set of coordinate values by using sign bits of said particular octant specified by said octant value.

74. The method of claim 73, further comprising scaling said first index component in accordance with said first coefficient component, thereby producing a first scaled index component, and further comprising scaling said second index component in accordance with said second coefficient component, thereby producing a second scaled index component.

75. The method of claim 74, wherein said first scaled index component and said second scaled index component are usable to select said first set of coordinate values from said plurality of predetermined sets of coordinate values.

76. The method of claim 68, wherein said first absolute/relative value indicates that said first normal is delta-encoded relative to a previously specified normal.

77. The method of claim 76, wherein said previously specified normal corresponds to a third point on said surface of said predetermined sphere, wherein said third point is identified by a third set of coordinate values, and wherein said third point is related to a fourth point within said first surface portion of said predetermined sphere by a first mapping, and wherein said fourth point corresponds to a fourth set of coordinate values previously selected by a previous index value.

78. The method of claim 77, wherein said one or more mapping values are included in a compressed representation of said previously specified normal.

79. The method of claim 78, wherein said one or more mapping values include a previous octant value which specifies a particular octant in which said third point is located, and wherein said one or more mapping values include a previous sub-octant value which specifies a particular sub-octant region within said second surface portion.

80. The method of claim 79, wherein said second point is also located in said particular octant.

81. The method of claim 80, wherein third point is located within a first sub-octant region of said particular octant.

82. The method of claim 81, wherein said second point is also located within said first sub-octant region of said particular octant.

83. The method of claim 82, wherein said second point is in a neighboring sub-octant region to said first sub-octant region of said particular octant.

84. The method of claim 83, wherein said neighboring sub-octant region shares an edge with said first sub-octant region of said particular octant.

85. The method of claim 79, wherein said selecting said first set of coordinate values includes adding said index value to said previous index value in order to produce a final index value, wherein said final index value is usable to select said first set of coordinate values from a plurality of predetermined sets of coordinate values, wherein each of said plurality of predetermined sets of coordinate values correspond to one of a plurality of predetermined points within said first surface portion of said predetermined sphere.

86. The method of claim 85, wherein said previous index value includes a previous first index component and a previous second index component, and wherein said final index value includes a final first index component and a final second index component.

87. The method of claim 86, wherein said adding said index value to said previous index value includes adding said first index component to said previous first index component, thereby generating said final first index component, and wherein said adding said index value to said previous index value further includes adding said second index component to said previous second index component, thereby generating said final second index value.

88. The method of claim 85, wherein said mapping said first set of coordinate values to said second set of coordinate values includes:
generating an intermediate set of coordinate values from said first set of coordinate values, wherein said intermediate set of coordinates values correspond to a an intermediate point located within said particular sub-octant region of said second surface portion specified by said previous sub-octant value;

generating magnitudes of said second set of coordinate values by using magnitudes of said intermediate set of coordinate values;

setting one or more sign bits of said second set of coordinate values by using sign bits of said particular octant specified by said previous octant value.

89. The method of claim 88, further comprising scaling said first index component in accordance with said first coefficient component, thereby producing a first scaled index component, and further comprising scaling said second index component in accordance with said second coefficient component, thereby producing a second scaled index component.

90. The method of claim 89, wherein said adding said index value to said previous index value includes adding said first scaled index component to said previous first index component to produce said final first index component, and wherein said adding said index value to said previous index value further includes adding said second scaled index component to said previous second index component to produce said final second index component.

91. The method of claim 90, wherein said final first index component and said final second index component are usable to select said first set of coordinate values from said plurality of predetermined sets of coordinate values.

92. A method for decompressing compressed 3-D geometry data which includes a compressed representation of a first normal corresponding to a first vertex, comprising:

receiving said compressed representation of said first normal, wherein said compressed representation includes at least an index value;

receiving one or more mapping values usable to decompress said first normal;

selecting a first set of coordinate values using said index value, wherein said first set of coordinate values correspond to a first set of coordinate axes, wherein said first set of coordinate axes define a first coordinate space which includes a predetermined sphere, wherein said first set of coordinate values identify a first point located in a first surface portion of said predetermined sphere, wherein said first surface portion corresponds to a predetermined sextant region of a second surface portion, wherein said second surface portion corresponds to a predetermined octant of said predetermined sphere;

mapping said first set of coordinate values to a second set of coordinate values using said one or more mapping values, wherein said second set of coordinate values correspond to said first set of coordinate axes, and wherein said second set of coordinate values specify a second point on said surface of said predetermined sphere;

and wherein said second set of coordinate values are usable to form a decompressed representation of said first normal.

93. The method of claim 92, wherein said compressed 3-D geometry data includes information describing a plurality of three-dimensional vertices, wherein said plurality of three-dimensional vertices are usable to form a plurality of geometric primitives in order to represent a surface of a three-dimensional graphical object.

94. The method of claim 92, wherein said index value includes a first index component and a second index component, wherein said first set of coordinate values are selected using both said first index component and said second index component.

95. The method of claim 94, wherein said first index component and said second index component are usable to locate points on a two-dimensional coordinate grid.

96. The method of claim 95, wherein said first index component and said second index component are usable to locate points on said predetermined sphere which are within said first surface portion.

97. The method of claim 96, wherein said first coordinate space is an xyz coordinate space, and wherein said first set of coordinate axes include an x axis, a y axis, and a z axis.

98. The method of claim 97, wherein said predetermined sphere is centered on an origin of said first set of coordinate axes.

99. The method of claim 97, wherein said first index component is a value of an angle $\theta$, wherein said angle $\theta$ is measured about said y axis to said first point on said predetermined sphere, and wherein said second index component is a value of an angle $\phi$, wherein said angle $\phi$ is measured latitudinally from the plane at y=0 to said first point on said predetermined sphere.

100. The method of claim 99, wherein said receiving said compressed representation of said first normal includes:

receiving a header portion which includes a first tag value;

determining a length value of a body portion using said first tag value;

receiving said body portion using said length value determined from said first tag value;

wherein said header portion and said body portion collectively include said compressed representation of said first normal.

101. The method of claim 100, further comprising using information in said header portion to determine a first normalization coefficient for said first normal, wherein said first normalization coefficient is usable for scaling said first index component and said second index component of said first normal to predetermined numeric ranges.

102. The method of claim 101, wherein said first normalization coefficient includes a first coefficient component and a second coefficient component.

103. The method of claim 102, further comprising using information in said header value to determine a first absolute/relative value for said first normal, wherein said first absolute/relative value indicates if said first normal is absolutely specified or delta-encoded.

104. The method of claim 103, wherein said first absolute/relative value indicates that said first normal is absolutely specified.

105. The method of claim 104, wherein said one or more mapping values are included in said compressed representation of said first normal.

106. The method of claim 105, wherein said one or more mapping values include an octant value and a sextant value, wherein said octant value specifies a particular octant of said predetermined sphere in which said second point is located, and wherein said sextant value specifies a particular sextant region within said second surface portion.

107. The method of claim 106, wherein said selecting a first set of coordinate values includes using said index value to select said first set of coordinate values from a plurality of predetermined sets of coordinate values, wherein each of said plurality of predetermined sets of coordinate values correspond to one of a plurality of predetermined points within said first surface portion of said predetermined sphere.

108. The method of claim 107, wherein said mapping said first set of coordinate values to said second set of coordinate values includes:

generating an intermediate set of coordinate values from said first set of coordinate values, wherein said intermediate set of coordinate values correspond to an intermediate point located within a particular sextant region of said second surface portion, wherein said particular sextant region is specified by said sextant value;

generating magnitudes of said second set of coordinate values by using magnitudes of said intermediate set of coordinate values;

setting one or more sign bits of said second set of coordinate values by using sign bits of said particular octant specified by said octant value.

109. The method of claim 108, wherein said generating said intermediate set of coordinate values includes permuting x, y, and z coordinates of said first set of coordinate values in order to fold said first set of coordinate values about the planes x=y, y=z, and x=z within said second surface portion, wherein said folded first set of coordinate values are usable as said intermediate set of coordinate values.

110. The method of claim 108, further comprising scaling said first index component in accordance with said first coefficient component, thereby producing a first scaled index component, and further comprising scaling said second index component in accordance with said second coefficient component, thereby producing a second scaled index component.

111. The method of claim 110, wherein said first scaled index component and said second scaled index component are usable to select said first set of coordinate values from said plurality of predetermined sets of coordinate values.

112. The method of claim 103, wherein said first absolute/relative value indicates that said first normal is delta-encoded relative to a previously specified normal.

113. The method of claim 112, wherein said previously specified normal corresponds to a third point on said surface of said predetermined sphere, wherein said third point is identified by a third set of coordinate values, and wherein said third point is related to a fourth point within said first surface portion of said predetermined sphere by a first mapping, and wherein said fourth point corresponds to a fourth set of coordinate values previously selected by a previous index value.

114. The method of claim 113, wherein said one or more mapping values are included in a compressed representation of said previously specified normal.

115. The method of claim 114, wherein said one or more mapping values include a previous octant value which specifies a particular octant in which said third point is located, and wherein said one or more mapping values include a previous sextant value which specifies a particular sextant region within said second surface portion.

116. The method of claim 115, wherein said second point is also located in said particular octant.

117. The method of claim 116, wherein said third point is located within a first sextant of said particular octant.

118. The method of claim 117, wherein said second point is also located within said first sextant of said particular octant.

119. The method of claim 118, wherein said second point is located in a neighboring sextant to said first sextant of said particular octant.

120. The method of claim 119, wherein said neighboring sextant shares an edge with said first sextant of said particular octant.

121. The method of claim 120, wherein said neighboring sextant is located in a octant which is different from said particular octant.

122. The method of claim 115, wherein said selecting said first set of coordinate values includes adding said index value to said previous index value in order to produce a final index value, wherein said final index value is usable to select said first set of coordinate values from a plurality of predetermined sets of coordinate values, wherein each of said plurality of predetermined sets of coordinate values correspond to one of a plurality of predetermined points within said first surface portion of said predetermined sphere.

123. The method of claim 122, wherein said previous index value includes a previous first index component and a previous second index component, and wherein said final index value includes a final first index component and a final second index component.

124. The method of claim 123, wherein said adding said index value to said previous index value includes adding said first index component to said previous first index component, thereby generating said final first index component, and wherein said adding said index value to said previous index value further includes adding said second index component to said previous second index component, thereby generating said final second index value.

125. The method of claim 122, wherein said mapping said first set of coordinate values to said second set of coordinate values includes:

generating an intermediate set of coordinate values from said first set of coordinate values, wherein said intermediate set of coordinates values correspond to a an intermediate point located within said particular sextant region of said second surface portion specified by said previous sextant value;

generating magnitudes of said second set of coordinate values by using magnitudes of said intermediate set of coordinate values;

setting one or more sign bits of said second set of coordinate values by using sign bits of said particular octant specified by said previous octant value.

126. The method of claim 125, wherein said generating said intermediate set of coordinate values includes permuting x, y, and z coordinates of said first set of coordinate values in order to fold said first set of coordinate values about the planes x=y, y=z, and x=z within said second surface portion, wherein said folded first set of coordinate values are usable as said intermediate set of coordinate values.

127. The method of claim 125, further comprising scaling said first index component in accordance with said first coefficient component, thereby producing a first scaled index component, and further comprising scaling said second index component in accordance with said second coefficient component, thereby producing a second scaled index component.

128. The method of claim 127, wherein said adding said index value to said previous index value includes adding said first scaled index component to said previous first index component to produce said final first index component, and wherein said adding said index value to said previous index value further includes adding said second scaled index component to said previous second index component to produce said final second index component.

129. The method of claim 128, wherein said final first index component and said final second index component are usable to select said first set of coordinate values from said plurality of predetermined sets of coordinate values.

130. A computer system for decompressing compressed 3-D geometry data which includes a compressed representation of a first normal corresponding to a first vertex, comprising:

an input unit coupled to receive said compressed representation of said first normal, wherein said compressed representation includes at least an index value, wherein said input unit is also configured to receive one or more mapping values;

a look-up table unit coupled to receive said index value from said input unit, wherein said look-up table unit is configured to output a first set of coordinate values in response to receiving said index value, wherein said first set of coordinate values correspond to a first set of coordinate axes, wherein said first set of coordinate axes define a first coordinate space which includes a predetermined sphere, wherein said first set of coordinate values identify a first point located in a predetermined region of a surface of said predetermined sphere;

a mapping unit coupled to receive said first set of coordinate values from said look-up table unit and said one or more mapping values from said input unit, wherein said mapping unit is configured to generate a second set of coordinate values from said first set of coordinate values using said one or more mapping values, wherein said second set of coordinate values correspond to said first set of coordinate axes, and wherein said second set of coordinate values specify a second point on said surface of said predetermined sphere;

wherein said second set of coordinate values is usable to form a decompressed representation of said first normal.

131. The computer system of claim 130, wherein said compressed 3-D geometry data includes information describing a plurality of three-dimensional vertices, wherein said plurality of three-dimensional vertices are usable to form a plurality of geometric primitives in order to represent a surface of a three-dimensional graphical object.

132. The computer system of claim 130, wherein said look-up table unit is configured to store a plurality of predetermined sets of coordinate values, wherein each of said plurality of predetermined sets of coordinate values correspond to one of a plurality of predetermined points within said predetermined region of said predetermined sphere.

133. The computer system of claim 132, wherein said look-up table unit is configured to select said first set of coordinate values from said plurality of predetermined sets of coordinate values in response to receiving said index value.

134. The computer system of claim 133, wherein said index value includes a first index component and a second index component, wherein said first set of coordinate values are selected using both said first index component and said second index component.

135. The computer system of claim 134, wherein said first index component and said second index component are usable to locate points on a two-dimensional coordinate grid.

136. The computer system of claim 135, wherein said first index component and said second index component are usable to locate points within said predetermined region of said surface of said predetermined sphere.

137. The computer system of claim 136, wherein said first coordinate space is an xyz coordinate space, and wherein said first set of coordinate axes include an x axis, a y axis, and a z axis.

138. The computer system of claim 137, wherein said predetermined sphere is centered on an origin of said first set of coordinate axes.

139. The computer system of claim 138, wherein said first index component is a value of an angle $\theta$, wherein said angle $\theta$ is measured about said y axis to said first point, and wherein said second index component is a value of an angle $\phi$, wherein said angle $\phi$ is measured latitudinally from the plane at y=0 to said first point.

140. The computer system of claim 136, wherein said predetermined sphere is centered on an origin of said first set of coordinate axes.

141. The computer system of claim 140, wherein said predetermined sphere is a unit sphere.

142. The computer system of claim 140, wherein said input unit is configured to receive a header data portion corresponding to said first normal.

143. The computer system of claim 142, further comprising a normal decompression table which includes a plurality of sets of decompression parameters usable for normal decompression.

144. The computer system of claim 143, wherein said input unit is configured to convey said header data portion to said normal decompression table, and wherein said normal decompression table is configured to convey a first set of decompression parameters to said input unit in response thereto.

145. The computer system of claim 144, wherein said first set of decompression parameters is effectively selected by a first tag value included in said header data portion.

146. The computer system of claim 145, wherein first set of decompression parameters are selected from the group consisting of: (i) a length value of said first tag value, (ii) a length value of a body data portion corresponding to said first normal, (iii) a first normalization coefficient corresponding to said first normal, and (iv) a first absolute/relative value corresponding to said first normal.

147. The computer system of claim 146, wherein said header data portion and said body data portion collectively include said compressed representation of said first normal.

148. The computer system of claim 146, wherein said first set of decompression parameters includes said length value of said body data portion, and wherein said input unit is configured to utilize said length value of said body data portion in receiving said body data portion.

149. The computer system of claim 148, wherein said first set of decompression parameters includes said first absolute/relative value, and wherein said first absolute/relative value indicates that said first normal is absolutely specified.

150. The computer system of claim 149, wherein said first set of decompression parameters includes said first normalization coefficient, wherein said first normalization coefficient includes a first coefficient component and a second coefficient component.

151. The computer system of claim 150, wherein said input unit is configured to scale said first index component of said index value according to said first coefficient component of said first normalization coefficient, thereby producing a first final index component.

152. The computer system of claim 151, wherein said input unit is configured to scale said second index component of said index value according to said second coefficient component of said first normalization coefficient, thereby producing a second final index component.

153. The computer system of claim 152, wherein said input unit is configured to convey said first final index component and said second final index component to said look-up table unit in order to select said first set of coordinate values from said plurality of predetermined sets of coordinate values.

154. The computer system of claim 153, wherein said first final index component and said second final index component are usable to locate points within said predetermined region of said predetermined sphere.

155. The computer system of claim 148, wherein said first set of decompression parameters includes said first absolute/ relative value, and wherein said first absolute/relative value indicates that said first normal is delta-encoded relative to a previously specified normal.

156. The computer system of claim 155, wherein said previously specified normal corresponds to a third point on said surface of said predetermined sphere, wherein said third point is identified by a third set of coordinate values, and wherein said third point is related to a fourth point within said predetermined region of said surface of said predetermined sphere by a first mapping, and wherein said fourth point corresponds to a fourth set of coordinate values previously selected by a previous index value.

157. The computer system of claim 155, wherein said input unit is configured to add said index value to said previous index value in order to produce a final index value, wherein said input unit is configured to convey said final index value to said look-up table unit in order to select said first set of coordinate values.

158. The computer system of claim 157, wherein said previous index value includes a previous first index component and a previous second index component, and wherein said final index value includes a final first index component and a final second index component, and wherein said first normalization coefficient includes a first coefficient component and a second coefficient component.

159. The computer system of claim 158, wherein said input unit is configured to add said first index component to said previous first index component in order to generate said final first index component, and wherein said look-up table unit is further configured to add said second index component to said previous second index component in order to generate said final second index component.

160. The computer system of claim 159, wherein said mapping unit is configured to generate said second set of coordinate values from said first set of coordinate values using said first mapping.

161. The computer system of claim 158, wherein said input unit is configured to scale said first index component in accordance with said first coefficient component, thereby producing a scaled first index component, and wherein said input unit is further configured to scale said second index component in accordance with said second coefficient component, thereby producing a scaled second index component.

162. The computer system of claim 158, wherein said input unit is configured to add said scaled first index component to said previous first index component in order to generate said final first index component, and wherein said look-up table unit is further configured to add said scaled second index component to said previous second index component in order to generate said final second index value.

163. The method of claim 162, wherein said final first index component and said final second index component are usable to select said first set of coordinate values from said plurality of predetermined sets of coordinate values.

164. The computer system of claim 130, wherein said predetermined region of said predetermined sphere is a predetermined octant of said predetermined sphere.

165. The computer system of claim 164, wherein said one or mapping values include an octant value specifying a particular octant of said predetermined sphere.

166. The computer system of claim 165, wherein said mapping unit is configured to generate magnitudes of said second set of coordinate values by using magnitudes of said first set of coordinate values, and wherein said mapping unit is configured to generate one or more sign bits of said second set of coordinate values by using sign bits of said particular octant specified by said octant value.

167. The computer system of claim 130, wherein said predetermined region of said predetermined sphere is a predetermined sub-octant region of a predetermined octant of said predetermined sphere.

168. The computer system of claim 167, wherein said one or mapping values include an octant value and a sub-octant value, wherein said octant value specifies a particular octant of said predetermined sphere, and wherein said sub-octant value specifies a particular sub-octant region in said predetermined octant of said predetermined sphere.

169. The computer system of claim 168, wherein said mapping unit is configured to generate magnitudes of said second set of coordinate values by mapping said first point located in said predetermined sub-octant region to said particular sub-octant region specified by said sub-octant value.

170. The computer system of claim 169, wherein said mapping unit is configured to generate one or more sign bits of said second set of coordinate values by using sign bits of said particular octant specified by said octant value.

171. The computer system of claim 139, wherein said predetermined region of said predetermined sphere is a predetermined sextant region of a predetermined octant of said predetermined sphere.

172. The computer system of claim 171, wherein said one or mapping values include an octant value and a sextant value, wherein said octant value specifies a particular octant of said predetermined sphere, and wherein said sextant value specifies a particular sextant region in said predetermined octant of said predetermined sphere.

173. The computer system of claim 172, wherein said mapping unit is configured to generate magnitudes of said second set of coordinate values by mapping said first point located in said predetermined sextant region to said particular sextant region specified by said sextant value.

174. The computer system of claim 173, wherein said mapping unit is configured to generate one or more sign bits of said second set of coordinate values by using sign bits of said particular octant specified by said octant value.

175. The computer system of claim 173, wherein said mapping unit is configured to generate magnitudes of said second set of coordinates by permuting xyz values of said first set of coordinates in order to perform foldings about the planes x=y, y=z, and x=z within said predetermined octant, wherein said foldings map said first point to a third point located in said particular sextant region specified by said sextant value.

176. A memory media for storing program instructions for decompressing compressed 3-D geometry data which includes a compressed representation of a first normal corresponding to a first vertex, wherein said program instructions are executable to implement the steps of:

receiving said compressed representation of said first normal, wherein said compressed representation includes at least an index value;

receiving one or more mapping values usable to decompress said first normal, wherein said one or more mapping values are included in said compressed representation of said first normal if said first normal is absolutely specified, and wherein said one or more mapping values are included in a compressed representation of a previously specified normal if said first normal is delta-encoded;

selecting a first set of coordinate values using said index value, wherein said first set of coordinate values correspond to a first set of coordinate axes, wherein said first set of coordinate axes define a first coordinate space which includes a predetermined sphere centered on an origin of said first set of coordinate axes, wherein said first set of coordinate values identify a first point located in a predetermined region of a surface of said predetermined sphere;

mapping said first set of coordinate values to a second set of coordinate values using said one or more mapping values, wherein said second set of coordinate values correspond to said first set of coordinate axes, and wherein said second set of coordinate values specify a second point on said surface of said predetermined sphere;

and wherein said second set of coordinate values are usable to form a decompressed representation of said first normal.

* * * * *

UNITED STATES PATENT AND TRADEMARK OFFICE

CERTIFICATE OF CORRECTION

PATENT NO. : 6,088,034

DATED : Jul. 11, 2000

INVENTOR(S) : Michael F. Deering

It is certified that error appears in the above-identified patent and that said Letters Patent is hereby corrected as shown below:

Claim 10, col. 26, line 22, delete $\theta$ and insert --$\phi$--.
Claim 10, col. 26, line 23, delete $\theta$ and insert --$\phi$--.

Signed and Sealed this

Twenty-second Day of May, 2001

Attest:

NICHOLAS P. GODICI

Attesting Officer   Acting Director of the United States Patent and Trademark Office